US012714959B2

(12) United States Patent
Russell et al.

(10) Patent No.: US 12,714,959 B2
(45) Date of Patent: Aug. 25, 2026

(54) LIQUID COLLECTOR

(71) Applicant: Baltimore Aircoil Company, Inc., Jessup, MD (US)

(72) Inventors: Gregory Adam Russell, Catonsville, MD (US); Christopher Patrick Auth, Woodbine, MD (US); Ryan John Most, Spring Grove, PA (US); Richard David Wall, III, Woodbine, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 83 days.

(21) Appl. No.: 18/377,659

(22) Filed: Oct. 6, 2023

(65) Prior Publication Data

US 2024/0118046 A1 Apr. 11, 2024

Related U.S. Application Data

(60) Provisional application No. 63/414,236, filed on Oct. 7, 2022.

(51) Int. Cl.
*B01D 45/08* (2006.01)
*F28F 25/00* (2006.01)

(52) U.S. Cl.
CPC ........ *B01D 45/08* (2013.01); *F28F 2025/005* (2013.01)

(58) Field of Classification Search
CPC ........ F28F 2009/0285; F28F 2025/005; B01D 45/08

(Continued)

(56) References Cited

U.S. PATENT DOCUMENTS 2,311,155 A 2/1943 Carr
2,431,389 A 11/1947 Fleisher
(Continued)

FOREIGN PATENT DOCUMENTS

CN 102341655 A 2/2012
DE 102018000896 A1 8/2019
(Continued)

OTHER PUBLICATIONS

Baltimore Aircoil Company, Inc.; Series V Cooling Tower, Product & Application Handbook vol. V; publicly available before Sep. 30, 2016; 27 pages.

(Continued)

*Primary Examiner* — Devon Lane

(74) *Attorney, Agent, or Firm* — Fitch, Even, Tabin & Flannery LLP

(57) ABSTRACT

In one aspect, a liquid collector having a forward lower edge, a connecting wall portion extending downwardly from the forward edge, a first layback wall portion connected to the connecting wall portion and extending upwardly and rearwardly from the connecting wall portion, an intermediate upper edge of the layback wall portion rearward of and above the forward lower edge. The liquid collector further includes an air diverter wall portion extending rearwardly from the first layback wall portion below the intermediate upper edge, a second layback wall portion extending upwardly and rearwardly of the air diverter wall portion, and a rearward upper edge of the second layback wall portion rearward of the intermediate upper edge and above the forward lower edge.

15 Claims, 27 Drawing Sheets

(58) Field of Classification Search
USPC .......................................................... 165/110
See application file for complete search history.

(56) References Cited

U.S. PATENT DOCUMENTS

| | | | |
|---|---|---|---|
| 2,775,310 | A | 12/1956 | Shelton |
| 3,290,867 | A | 12/1966 | Jacir |
| 3,384,165 | A | 5/1968 | Mathews |
| 3,437,319 | A | 4/1969 | Engalitcheff, Jr. |
| 3,572,657 | A | 3/1971 | Bradley, Jr. |
| 3,784,171 | A | 1/1974 | Engalitcheff, Jr. |
| 4,044,078 | A | 8/1977 | Curtis |
| 4,196,157 | A | 4/1980 | Schinner |
| 4,198,215 | A | 4/1980 | Regehr |
| 4,218,408 | A | 8/1980 | Henning |
| 4,521,350 | A | 6/1985 | Lefevre |
| 5,268,011 | A | 12/1993 | Wurz |
| 5,545,356 | A | 8/1996 | Curtis |
| 5,645,770 | A | 7/1997 | McNulty |
| 5,958,306 | A | 9/1999 | Curtis |
| 6,070,426 | A | 6/2000 | Sakashita |
| 6,237,900 | B1 | 5/2001 | Drew |
| 6,574,980 | B1 | 6/2003 | Morrison |
| 7,618,472 | B2 * | 11/2009 | Agnello ................ B01D 45/08 55/440 |
| 8,585,024 | B2 | 11/2013 | Ferree |
| 9,033,318 | B2 | 5/2015 | Curtis |
| 9,273,915 | B2 | 3/2016 | Patel |
| 9,644,904 | B2 | 5/2017 | Curtis |
| 9,841,238 | B2 | 12/2017 | Curtis |
| 9,897,399 | B2 | 2/2018 | Kroeger |
| 9,970,719 | B2 | 5/2018 | Bean, Jr. |
| 10,677,543 | B2 | 6/2020 | Auth |
| 10,775,117 | B2 | 9/2020 | Rousselet |
| 10,852,079 | B2 | 12/2020 | Curtis |
| 11,248,859 | B2 | 2/2022 | Auth |
| 11,255,620 | B2 | 2/2022 | Rousselet |
| 2006/0125124 | A1 | 6/2006 | Koplin |
| 2007/0187851 | A1 | 8/2007 | Facius |
| 2011/0049733 | A1 | 3/2011 | Ferree |
| 2011/0315350 | A1 | 12/2011 | Curtis |
| 2012/0061055 | A1 | 3/2012 | Bugler, III |
| 2012/0111762 | A1 | 5/2012 | Patel |
| 2013/0276476 | A1 | 10/2013 | Wong |
| 2014/0166254 | A1 | 6/2014 | Carter |
| 2015/0330710 | A1 | 11/2015 | Curtis |
| 2016/0290745 | A1 | 10/2016 | Kröger |
| 2018/0094884 | A1 | 4/2018 | Rousselet |
| 2019/0063855 | A1 * | 2/2019 | Auth .................... F28D 1/0477 |
| 2020/0256629 | A1 | 8/2020 | Auth |
| 2020/0363145 | A1 | 11/2020 | Rousselet |
| 2021/0318082 | A1 * | 10/2021 | Curtis ...................... F28C 1/02 |

FOREIGN PATENT DOCUMENTS

| | | | | | |
|---|---|---|---|---|---|
| EP | 0931993 | A1 | 7/1999 | | |
| EP | 1191296 | A2 | 3/2002 | | |
| JP | H10118484 | A * | 5/1998 | | |
| JP | 2005214574 | A | 8/2005 | | |
| JP | 2016510869 | A | 4/2016 | | |
| KR | 20110061726 | A | 6/2011 | | |
| WO | 9310891 | A1 | 6/1993 | | |
| WO | 2011009048 | A1 | 1/2011 | | |
| WO | 2015071882 | A1 | 5/2015 | | |
| WO | WO-2018010710 | A1 * | 1/2018 | ............ | B01D 45/08 |

OTHER PUBLICATIONS

GOHL®, Dunstturm DT ecoTEC, Kühlturm offener Kreislauf (product brochure in German regarding forced draft tower with unhoused centrifugal fan concept); Oct. 2014, 8 pages.
Invitation to Pay Additional Fees from related International Application No. PCT/US2023/034689 dated Dec. 12, 2023; 4 pages.
Munters Corporation; Polymer Fluid Cooler (PFC) product guide; Sep. 2015, 2 pages.
Tower Tech, Inc.; TTXR Series Technical Reference Guide; Jan. 2012, 24 pages.
PCT Search Report and Written Opinion from related International Application No. PCT/US2023/034689 dated Mar. 11, 2024; 17 pages.
Partial Supplementary European Search Report from related European Application No. 23875571.4 dated Jun. 26, 2026; 12 pages.

* cited by examiner

270

| | Trial | Air Exit | dP at 700 fpm | | Collector Cross Section Area | | | Flow Directed to | |
|---|---|---|---|---|---|---|---|---|---|
| | | Vector | Pressure | Of Base | Vol. 1 | Vol. 2 | Vol. (1+2) | Vol. 1 | Vol. 2 |
| | | (°) | (psi) | (%) | ($in^2$) | ($in^2$) | ($in^2$) | (%) | (%) |
| 274 | Baseline | 55.7 | 0.034 | 100% | 6.5 | 1.3 | 7.8 | 100% | 0% |
| 276 | T4-33 | 7.9 | 0.028 | 81% | 10.8 | 6.6 | 17.3 | 61% | 39% |

| | Trial | Potential Capacity | | Water Impact Angles | | Collector | |
|---|---|---|---|---|---|---|---|
| | | Total | Of Base | Primary | Secondary | Height | Spacing |
| | | ($in^2$) | (%) | (°) | (°) | (in) | (in) |
| 274 | Baseline | 6.5 | 100% | 45.0 | 25.8 | 10.1 | 4.35 |
| 276 | T4-33 | 17.2 | 265% | 21.0 | 27.5 | 10.0 | 4.50 |

FIG. 10

LIQUID COLLECTOR

CROSS-REFERENCE TO RELATED APPLICATION

This application claims the benefit of U.S. Provisional Patent Application No. 63/414,236, filed Oct. 7, 2022, which is hereby incorporated herein by reference in its entirety.

FIELD

This disclosure relates to heat exchangers that utilize liquid and, more specifically, to heat exchangers that distribute liquid onto a heat exchange medium and have a liquid collector to collect the liquid after the liquid has contacted the heat exchange medium.

BACKGROUND

Some heat exchange systems have a heat exchanger, such as an indirect or direct heat exchanger, with a heat exchange medium such as fill, a coil, or a plate-type heat exchanger, a fan to generate movement of air across the heat exchange medium, and a system to distribute a liquid (e.g., water) onto the heat exchange medium. An indirect heat exchanger such as coil, plate, or pillow-type heat exchanger has an interior that contains a first fluid (e.g., a working fluid) and the flow of a second fluid (e.g., air) across exterior surfaces of the indirect heat exchanger absorbs heat indirectly through a wall of the indirect heat exchanger.

Cooling towers are an example of a heat exchange system and include parallel flow, cross-flow, and counter flow configurations. Counter flow cooling towers with indirect heat exchangers direct airflow in a first direction (e.g., generally upward) via a fan of the cooling tower across the indirect heat exchanger and have a liquid distribution system that distributes a liquid (e.g. water) in an opposite, second direction (e.g., generally downward) onto the indirect heat exchanger. The water may contain, for example, one or more chemicals to inhibit organism growth and/or one or more chemicals (e.g. glycol) to inhibit freezing.

Some counter flow cooling towers have water collectors that collect the water as the water falls from the indirect heat exchanger and direct the collected water to a sump of the cooling tower. The water collectors are spaced apart to form openings therebetween that permit air to travel around the water collectors and into contact with the indirect heat exchanger.

SUMMARY

In one aspect of the present disclosure, a liquid collector is provided for collecting a falling liquid while permitting air to flow about the liquid collector. The liquid collector includes a forward lower edge, a connecting wall portion extending downwardly from the forward edge, and a first layback wall portion connected to the connecting wall portion and extending upwardly and rearwardly away from the connecting wall portion. The first layback wall portion has a first inclined surface to receive liquid thereon and direct the liquid toward the connecting wall portion. The liquid collector further includes an intermediate upper edge of the layback wall portion rearward of and above the forward lower edge, an air diverter wall portion extending rearwardly from the first layback wall portion below the intermediate upper edge, and a second layback wall portion extending upwardly and rearwardly of the air diverter wall portion. The second layback wall portion has a second inclined surface to receive liquid thereon and direct the liquid toward the air diverter wall portion. The liquid collector also has a rearward upper edge of the second layback wall portion rearward of the intermediate upper edge and above the forward lower edge. The first and second layback wall portions direct airflow along the forward and rearward sides of the water collector with limited redirecting of the airflow, which reduces the air pressure drop across the liquid collector and improves the efficiency of a heat exchange apparatus utilizing the liquid collector.

The present disclosure also provides a heat exchange apparatus including a heat exchanger, a liquid distribution system configured to distribute liquid onto the heat exchanger, and a pair of spaced rails. The heat exchange apparatus further includes a plurality of liquid collectors for collecting at least a portion of the liquid distributed onto the heat exchanger and mounts of the liquid collectors configured to facilitate positioning the liquid collectors side-by-side along the rails. The mounts of the liquid collectors have interlocking portions configured to engage and inhibit movement of the liquid collectors with the liquid collectors positioned along the rails. In this manner, the liquid collectors can be readily installed in the heat exchange apparatus by positioning the liquid collectors side-by-side along the rails to engage the interlocking portions of the mounts. Similarly, the liquid collectors can be readily removed for cleaning or replacement by disengaging the interlocking portions of the mounts and moving the liquid collectors away from one another along the rails.

In another aspect of the present disclosure, a method is provided for assembling a liquid collector array such as liquid collector array in a cooling tower. The method includes positioning mounts of a first liquid collector upon rails of the liquid collector array and shifting the first liquid collector along the rails to a first installed position. The first liquid collector is inclined with the first liquid collector in the first installed position to cause liquid in at least one gutter of the first liquid collector to discharge from the first liquid collector. The method further includes positioning mounts of a second liquid collector upon the rails of the liquid collector array and shifting the second liquid collector along the rails to a second installed position proximate the first liquid collector. The second liquid collector is inclined with the second liquid collector in the second installed position to cause liquid in at least one gutter of the second liquid collector to discharge from the second liquid collector. The method thereby permits an intuitive and straightforward approach to assembling a liquid collector array and may be performed without removing the rails from a supporting structure, such as an internal frame of a cooling tower.

The present disclosure also provides a heat exchange apparatus including a housing having a first outer wall and a second outer wall opposite the first outer wall, a heat exchanger in the housing, a fan operable to generate airflow relative to the heat exchanger, and a liquid distribution system to distribute liquid onto the heat exchanger. The heat exchange apparatus further includes a first liquid collector array comprising a plurality of first liquid collectors having gutters to collect liquid falling from the heat exchanger and first spacings between the first liquid collectors to permit air to travel between the first liquid collectors. The first liquid collectors of the first liquid collector array are configured to direct air from the first spacings in a first direction away from the first wall and toward the heat exchanger. The heat exchange apparatus further includes a second liquid collector array comprising a plurality of second liquid collectors having gutters to collect liquid falling from the heat exchanger and spacings between the second liquid collectors to permit air to travel between the second liquid collectors. The second liquid collectors of the second liquid collector array are configured to direct air from the second spacings in a second direction transverse to the first direction, the second direction being away from the second outer wall and toward the heat exchanger. The first and second liquid collector arrays increase the efficiency of heat transfer from the heat exchanger by directing the air away from the first and second outer walls of the housing and toward the heat exchanger.

In yet another aspect of the present disclosure, a heat exchange apparatus is provided that includes a housing, a heat exchanger in the housing, a fan operable to cause air to contact the heat exchanger and a sump in the housing for liquid. The heat exchange apparatus further includes a liquid distribution system operable to direct the liquid from the sump to the heat exchanger and a pump of the liquid distribution system in the housing. Because the pump is inside the housing, the pump is protected from weather which improves the durability of the pump and the pump may be serviced by a technician even if it is raining outside of the housing. Further, because the pump is inside the housing, the pump is within the footprint of the heat exchange apparatus which provides a more compact profile for the heat exchange apparatus during shipping and/or installation.

BRIEF DESCRIPTION OF THE DRAWINGS

FIGS. 9 and 10 are tables comparing properties of the air flow and geometry of the liquid collectors of FIGS. 7 and 8;

DETAILED DESCRIPTION

Figure 1:
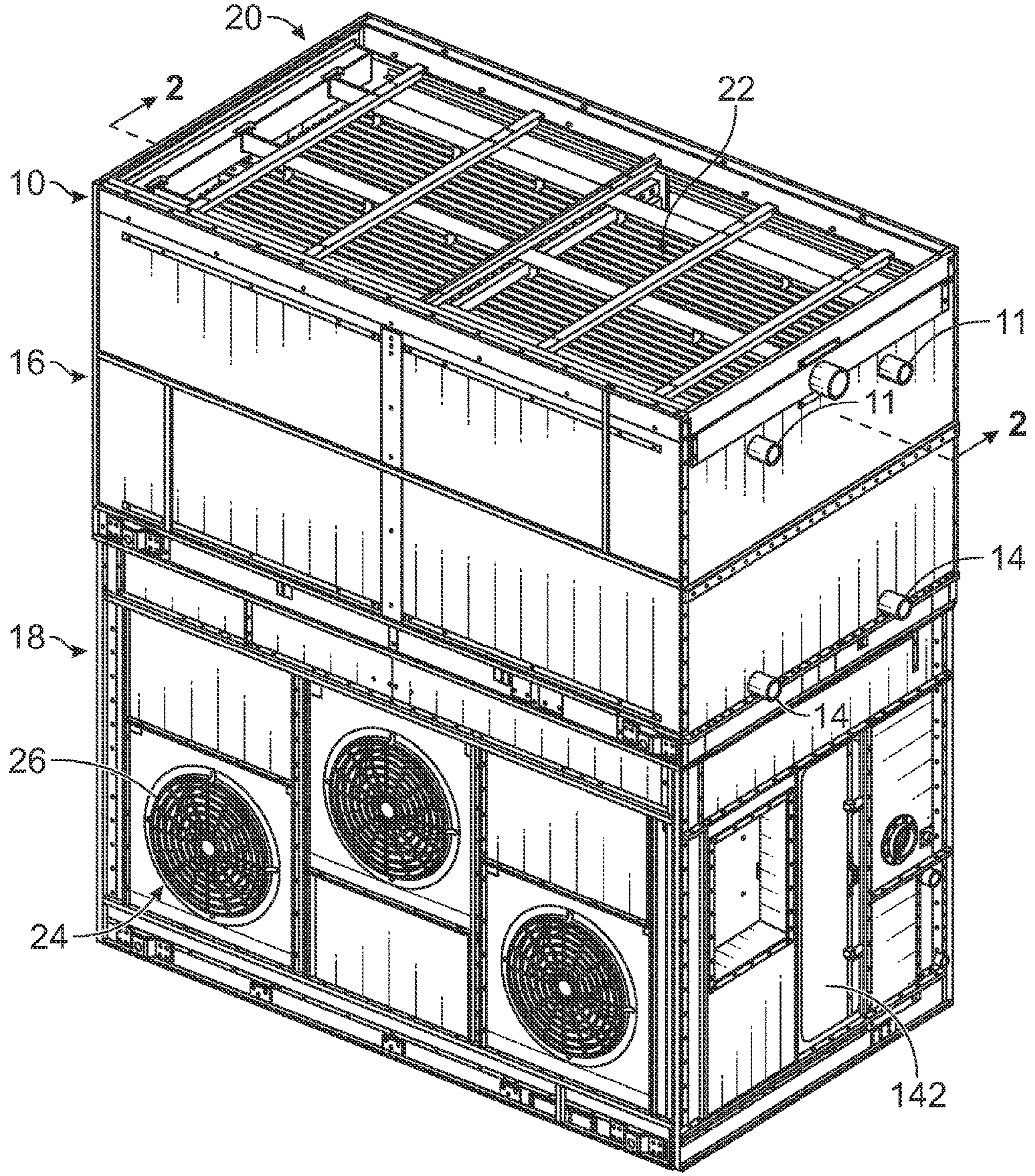
FIG. 1 is a perspective view of a heat exchange apparatus including an upper heat exchange subassembly and a lower liquid collector and fan subassembly.
Figure 2:
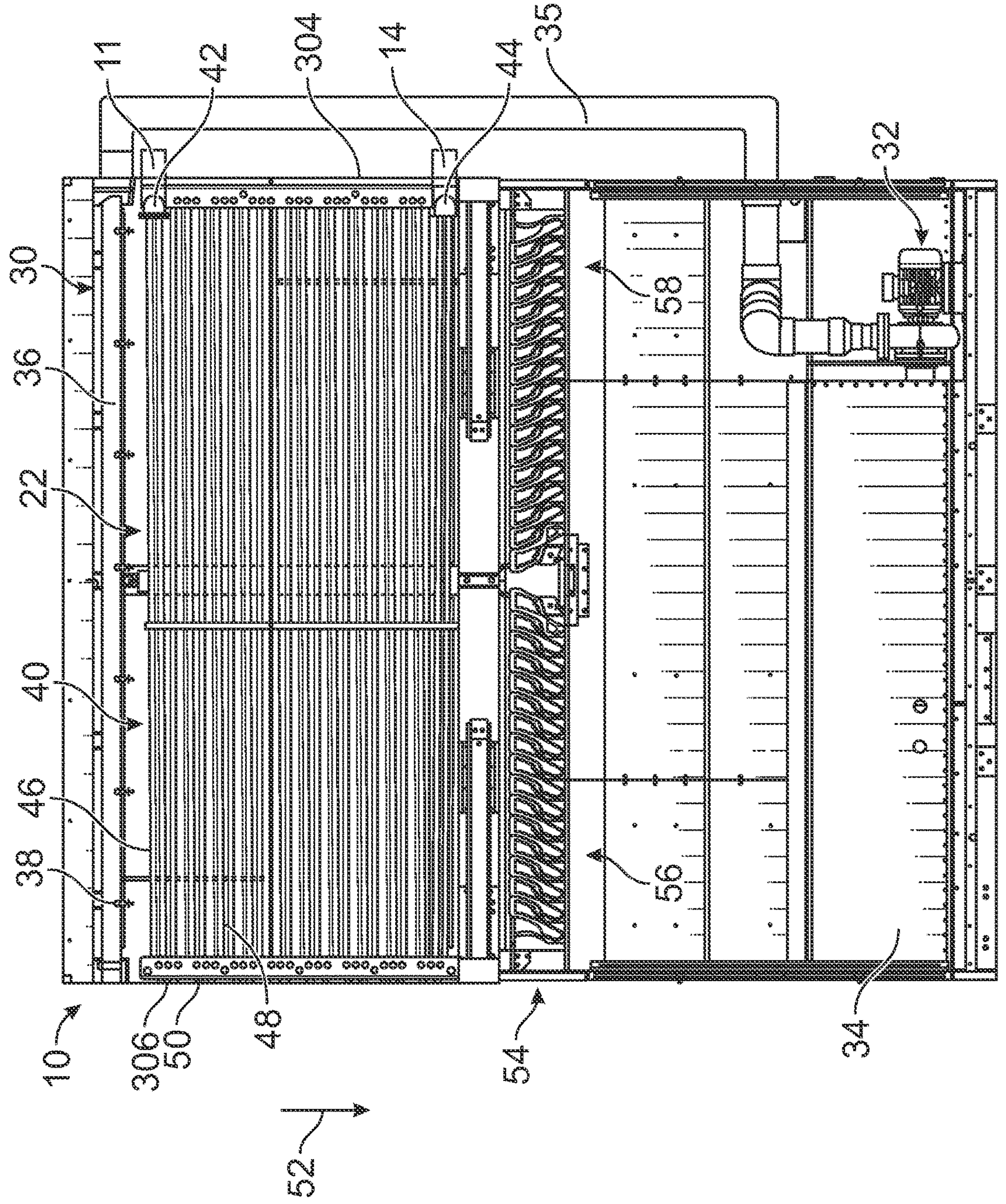
FIG. 2 is a cross-sectional view taken across line 2-2 in FIG. 1 showing a liquid distribution system, an indirect heat exchanger, a liquid collector assembly, and a sump of the heat exchange apparatus of FIG. 1.

With reference to FIG. 1, a heat exchange apparatus, such as a cooling tower 10 is provided that receives a heated working fluid at inlets 11 and provides cooled working fluid at outlets 14. The cooling tower 10 includes an upper heat exchange subassembly 16 and a lower liquid collector and fan subassembly 18. The heat exchange subassembly 16 has an air outlet 20 that permits air to exit a cooling tower 10 after the air has contacted an indirect heat exchanger 22 as shown in FIG. 2. The liquid collector and fan subassembly 18 has an air inlet 24, such as one or more air inlets, and an airflow generator, such as one or more fans 26, that draw air into the cooling tower 10. The fans 26 include electric motors that rotate fan members having blades to cause air to travel from the air inlet 24 to the air outlet 20.

With reference to FIG. 2, the cooling tower 10 includes a liquid distribution system 30 having a pump 32 for pumping collected liquid from a sump 34 of the cooling tower 10, into tubing 35, and to a distribution header 36 of the liquid distribution system 30. The distribution header 36 has one or more outlets, such as spray nozzles 38 or openings, for distributing droplets of liquid onto the indirect heat exchanger 22. In one embodiment, the indirect heat exchanger 22 includes a coil 40 having an inlet header 42 that receives the working fluid from the inlet 12, an outlet header 44 that directs the collected working fluid to the outlets 14, and serpentine tubes 46 connecting the inlet and outlet headers 42, 44. The serpentine tubes 46 include runs 48 and return ends 50 connecting the runs. The liquid from the spray nozzles 38 travels generally downwardly across the serpentine tubes 46 in direction 52 into a liquid collector apparatus 54. The liquid collector apparatus 54 collects the liquid and directs the liquid away from the fans 26 for recirculation back to the distribution header 36. The liquid collector apparatus 54 includes a first liquid collector array 56 and a second liquid collector array 58 that capture the falling liquid.

The liquid distributed onto the indirect heat exchanger 22 absorbs heat from the indirect heat exchanger 22 with a portion of the liquid evaporating as the liquid travels over the coil 40. The flow of air over the coil 40 and the liquid moving across the coil 40 removes heat from the working fluid traveling through the interior of the indirect heat exchanger 22. The cooling tower 10 may be operated in a dry mode or a wet mode. In the dry mode, the pump 32 does not pump liquid to the distribution header 36 and heat is removed from the working fluid by movement of air over the coil 40. In the wet mode, the pump 32 pumps liquid to the distribution header 36 and heat is removed from the working fluid as described above. In some embodiments, the cooling tower 10 may be operated in a wet-only mode wherein the fans 26 are not operated but the pump 32 is operated such that heat is removed primarily from the working fluid in the coil 40 by the liquid traveling over the coil 40.

Figure 3:
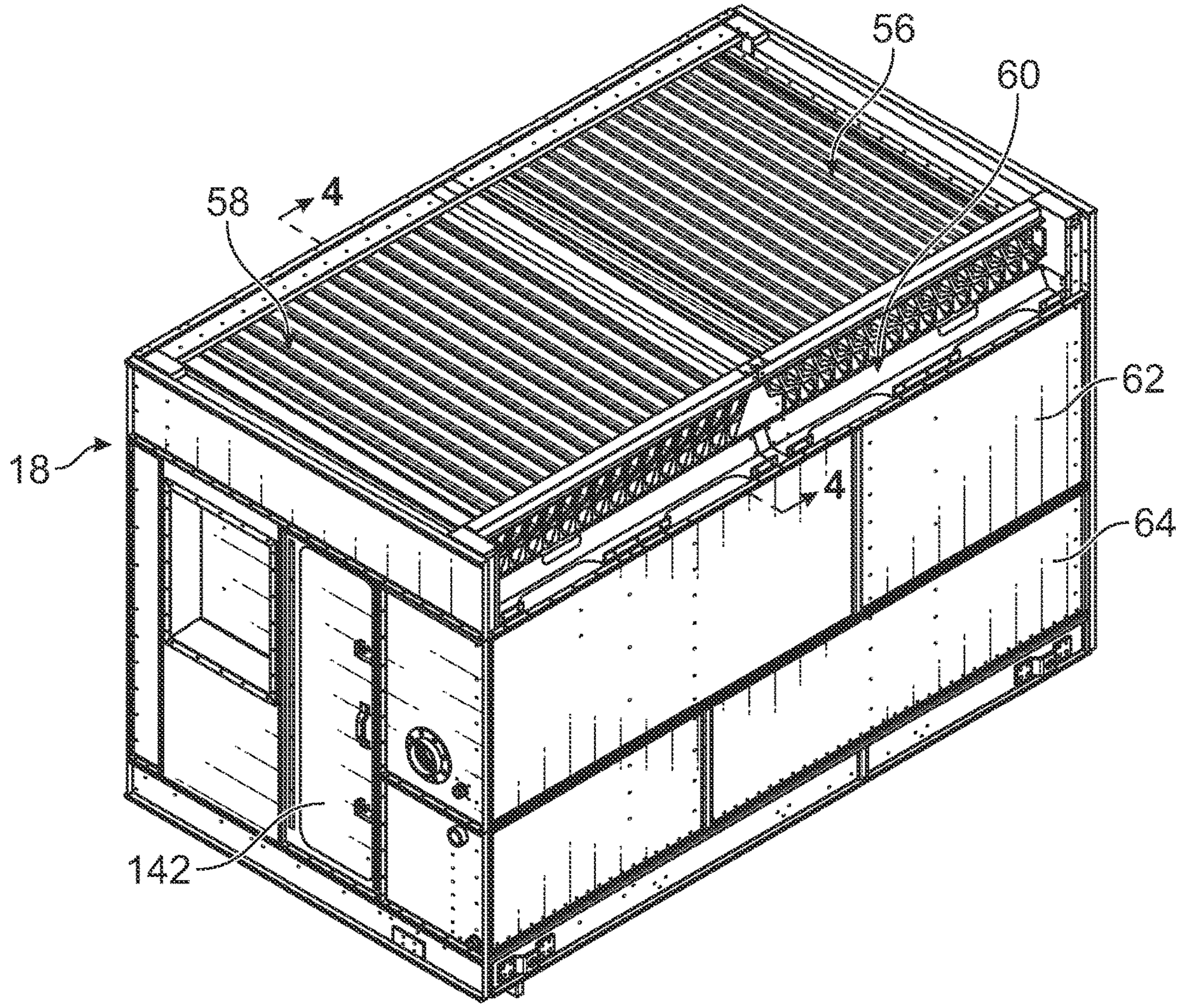
FIG. 3 is a perspective view of the liquid collector and fan subassembly of FIG. 1 showing first and second liquid collector arrays that direct collected liquid into a gutter of the lower liquid collector and fan subassembly.

With reference to FIG. 3, the liquid collector and fan subassembly 18 is shown with the heat exchange subassembly 16 removed to show the first and second liquid collector arrays 56, 58. Also removed is a portion of an outer wall 62 of a housing 64 of the cooling tower 10 to show a gutter 60 of the liquid collector and fan subassembly 18. The first and second liquid collector arrays 56, 58 are inclined to direct collected liquid into the gutter 60 near the outer wall 62 of the housing 64. The first and second liquid collector arrays 56, 58 are generally mirror images of one another about a center of the cooling tower 10, with each of the first and second liquid collector arrays 56, 58 directing airflow toward the airflow exiting the other of the first and second liquid collector arrays 56, 58.

Figure 4:
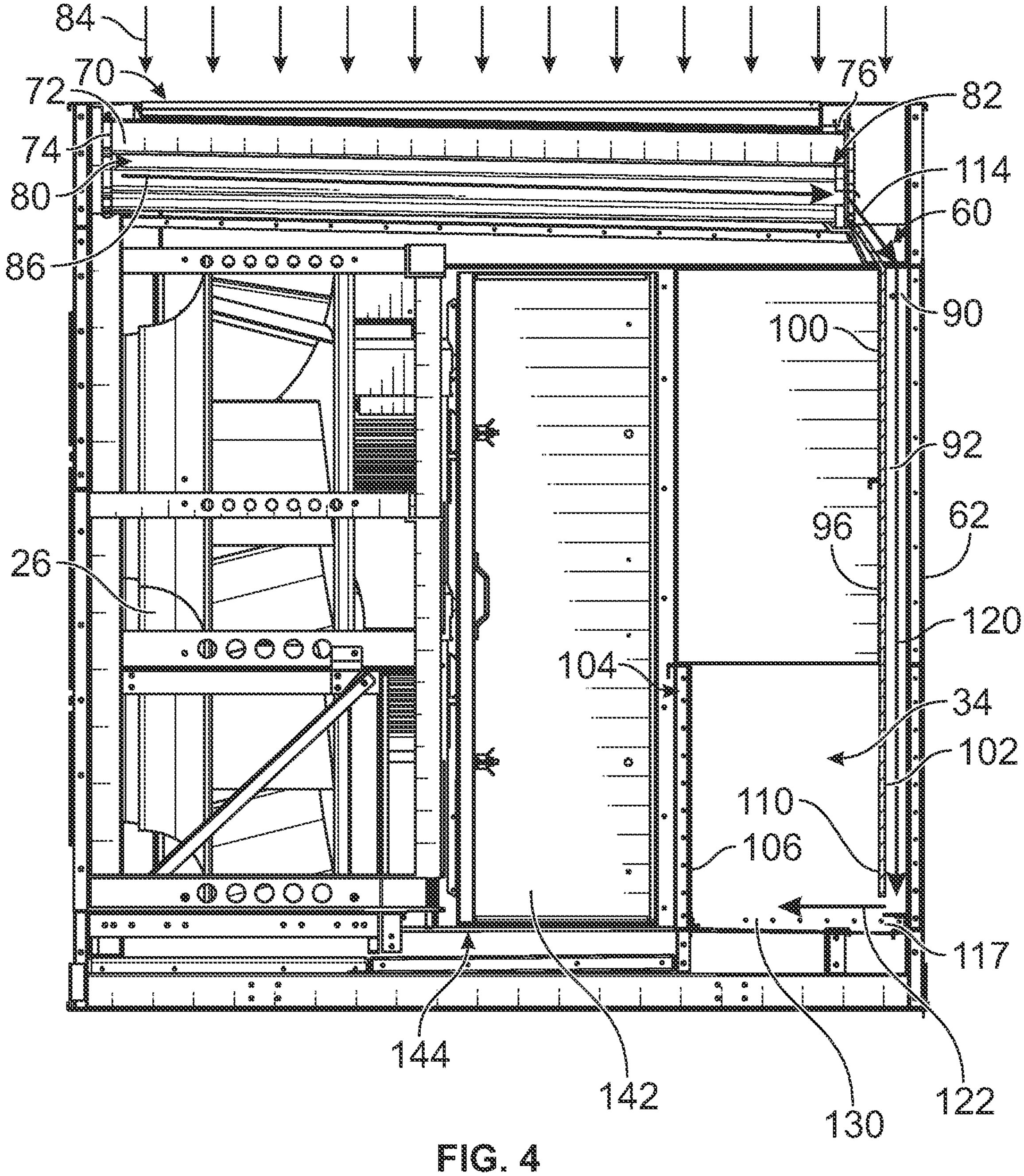
FIG. 4 is a cross-sectional view taken across line 4-4 in FIG. 3 showing liquid flowing along one of the liquid collectors, into the gutter, downward through a gap between inner and outer walls, and into the sump.
Figure 5:
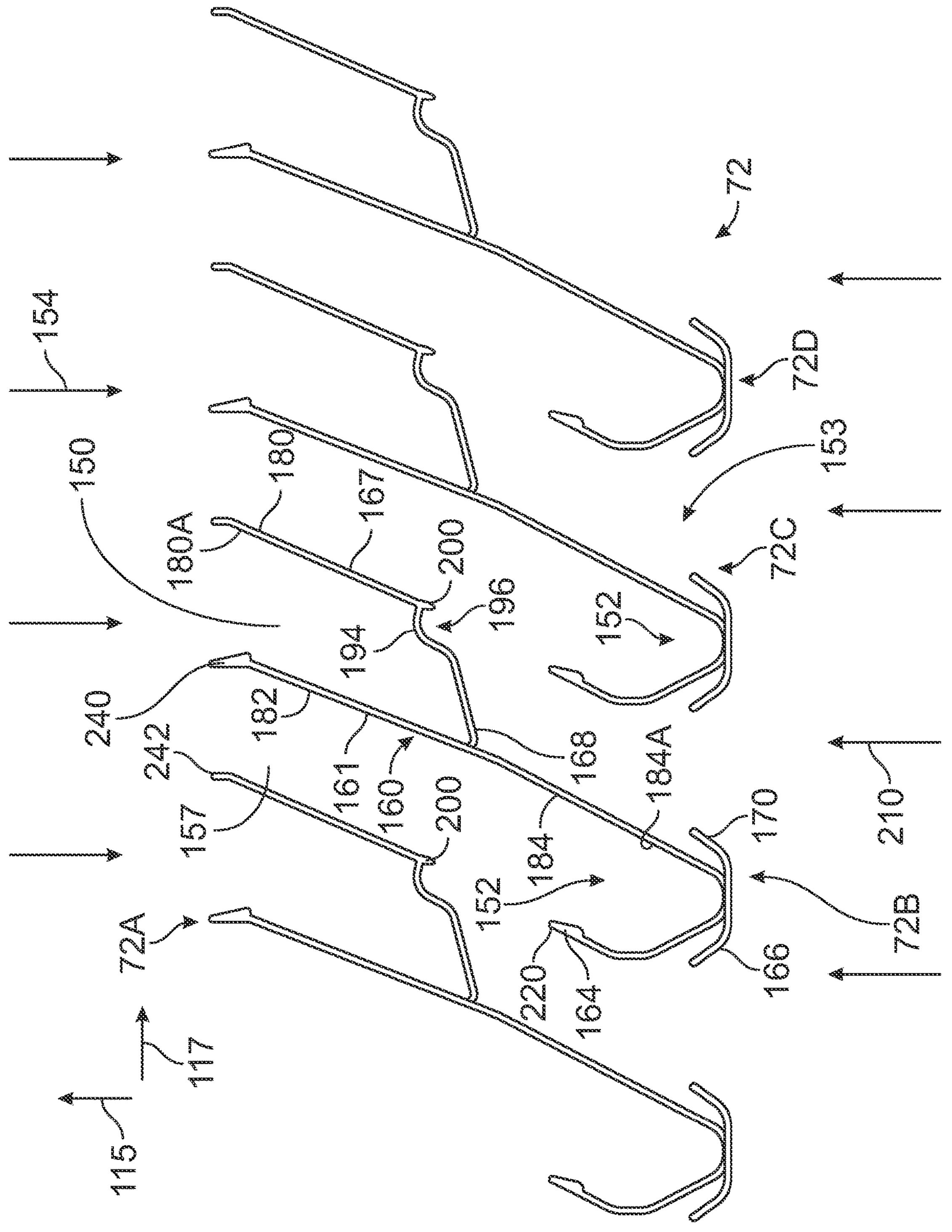
FIG. 5 is an elevational view of nested liquid collectors of the liquid collection assembly of FIG. 2 showing upper primary gutters and lower secondary gutters of each of the liquid collectors.

With reference to FIG. 4, the first and second liquid collector arrays 56, 58 each include two or more liquid collectors such as liquid collector assemblies 70. The liquid collectors discussed herein may be, for example, a single member or an assembly of components. The liquid collector assemblies 70 each have a liquid collector body 72 and mounts such as a closed endcap 74 and an open endcap 76 at opposite ends of the liquid collector body 72. With reference to FIG. 5, each liquid collector body 72 has a first collection channel such as primary gutter 150 and a secondary collection channel such as secondary gutter 152 to receive liquid 154 falling downwardly from the coil 40. Further, the liquid collectors 72 are spaced laterally from one another to form openings 153 that permit air 210 to travel upwardly through the first and second liquid collector arrays 56, 58.

Returning to FIG. 4, each liquid collector body 72 has an elevated portion 80 and a lowered portion 82 such that liquid falling from the coil 40 is collected in the liquid collector body 72 and travels in direction 86 into the gutter 60. The gutter 60 has an outlet 90 that directs liquid into a gap 92 between the outer wall 62 and an inner wall 96. The inner wall 96 has an upper end portion 100 at the gutter 60 and a lower end portion 102 below an upper portion 104 of the sump 34. The sump 34 has an inner wall 106 and a bottom wall 108. The lower end portion 102 of the inner wall 96 has a lowermost end 110 with a spacing 112 from the bottom wall 108 of the sump 34. The liquid travels in direction 114 from the liquid collector body 72, through the gutter 60, and into the gap 92. The liquid travels in direction 120 downward along the gap 92 under the effect of gravity before traveling in direction 122 through the spacing 112 and into the sump 34. Because the collected liquid enters the sump 34 at a lower end portion 130 of the sump 34, the collected liquid creates turbulence within the sump 34 and limits settling of particles in the sump 34.

Figure 14:
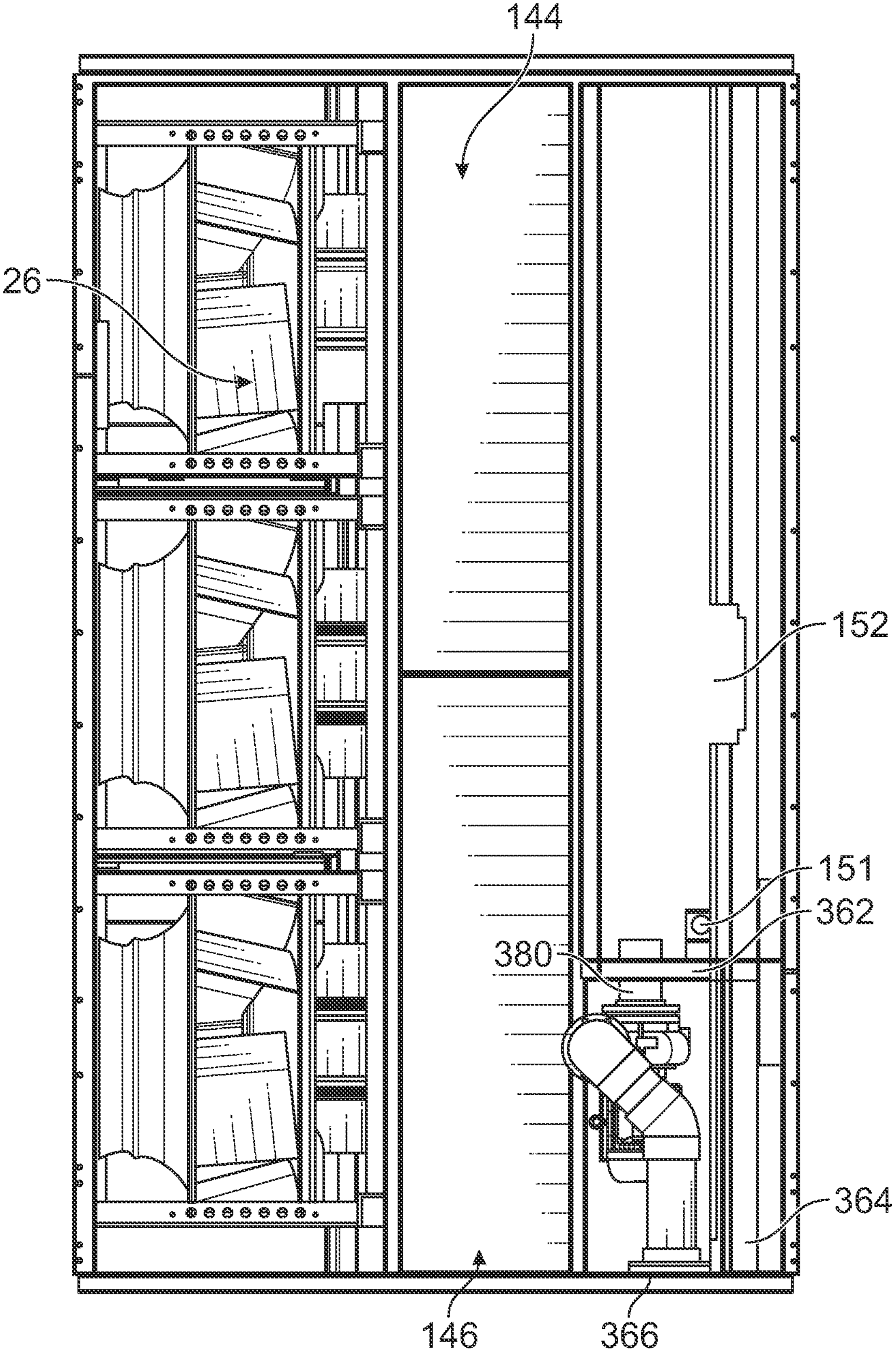
FIG. 14 is a top plan view of a lower portion of the liquid collector and fan subassembly of FIG. 3 with the liquid collector array removed to show a fan area, a walkway, and a sump area on an opposite side of the walkway than the fan area.

With reference to FIGS. 1, 3, 4, the liquid collector and fan subassembly 18 has doors 140, 142 and a walkway 144 that extends therebetween. The walkway 144 permits a maintenance worker to walk in a maintenance area 146 (see FIG. 14) between the fans 26 and the sump 34 and service and/or clean the fans 26 and the sump 34. A maintenance worker may readily clean the sump 34 when the pump 32 is off by opening a drain 151 (see FIG. 14), draining the sump 34, and scrubbing or otherwise cleaning the interior surfaces of the sump 34. Further, because the entirety of the sump 34 is on one side of the walkway 14 opposite the fans 26, the sump 34 is in an easy-to-access area of the interior of the cooling tower 10 rather than extending under the fans as in some prior cooling towers wherein the sump extends across the entire footprint of the cooling tower.

With reference to FIG. 5, the liquid collectors 72 of the first liquid collector array 58 include liquid collectors 72A, 72B, 72C, 72D. The liquid collectors 72 are elongate and have a uniform cross-section perpendicular to their length throughout the liquid collector body 72. The liquid collectors 72 may be manufactured, for example, by extruding a metallic, plastic, and/or composite material into the desired cross-section. The liquid collectors 72 may have a length selected for a particular embodiment, such as three feet to twenty-four feet long.

The liquid collector bodies 72 of FIG. 5 have a similar configuration and liquid collector bodies 72A, 72B will be described. The liquid collector body 72B includes the primary gutter 150 and the secondary gutter 152. The liquid collector bodies 72 are nested such that the primary gutter 150 of the liquid collector body 72A overlaps with the secondary gutter 152 in a first direction 115, e.g., vertical, with the adjacent liquid collector body 72B. The liquid collector body 72A is spaced from the liquid collector body 72B in a second direction 117, such as horizontal, to form the openings 153 between the liquid collectors 72 that permits air 210 to travel therebetween.

The primary gutter 150 of each liquid collector body 72 captures a majority of the liquid 154 collected by each liquid collector body 72, such as approximately 60% of the liquid 154. The remaining liquid 154 falls into a spacing 157 between the liquid collectors 72A, 72B and lands on a liquid impact surface 160. The liquid impact surface 160 has an upper surface portion 161 that extends at an angle 163 (see FIG. 6) in the range of approximately 19 degrees to approximately 22 degrees, such as approximately 21 degrees, from vertical. The inclination of the liquid impact surface upper portion 161 at angle 163 reduces splash off of the liquid impact surface 160. Further, the inclination of the liquid impact surface portion 161 and vertical redirecting portion 240 (see FIG. 6) of liquid collector body 72B and a vertical redirecting portion 242 of the adjacent liquid collector body 72A direct airflow generally vertically upward from the spacing 157.

Regarding FIG. 5, almost all of the liquid that enters the secondary gutter 152 enters the secondary gutter 152 by smoothly flowing down the liquid impact surface. It is inevitable that some liquid accumulates on a surface 167 during operation of the cooling tower 10. The liquid travels downwardly along the surface 167 until reaching a drip off, such as a drip edge 200, of the liquid collector body 72B. The liquid then falls from the drip edge 200 into the secondary gutter 152.

The liquid collector body 72B has a lip 164 to keep liquid retained in the secondary gutter 152. Any liquid that travels over the lip 164 may be captured in a tertiary gutter 166 and any liquid that travels down along the opposite side of the liquid collector body 72B may be collected at a tertiary gutter 170. Although the liquid that arrives at the tertiary gutters 166, 170 may be extremely small in volume, such as a few drips during a day of operation, however it may be beneficial in some embodiments to utilize the tertiary gutters 166, 170 to further inhibit liquid from falling though the liquid collector assembly 54.

Regarding FIG. 5, the liquid collector body 72B includes an air diverter 168, a primary gutter wall portion 180 upstanding from the air diverter 168 and having a surface portion 180A to receive falling liquid. The liquid collector body 72B has a secondary gutter wall portion 182 upstanding on an opposite side of the primary gutter 150 from the air diverter 168 and a lower secondary gutter wall portion 184 extending downwardly from the air diverter 168. The lower secondary gutter wall portion 184 includes a lower surface portion 184A of the impact surface 160. The liquid impact surface lower portion 184A and the liquid impact surface upper portion 161 have an angle less than 180 degrees.

Figure 6:
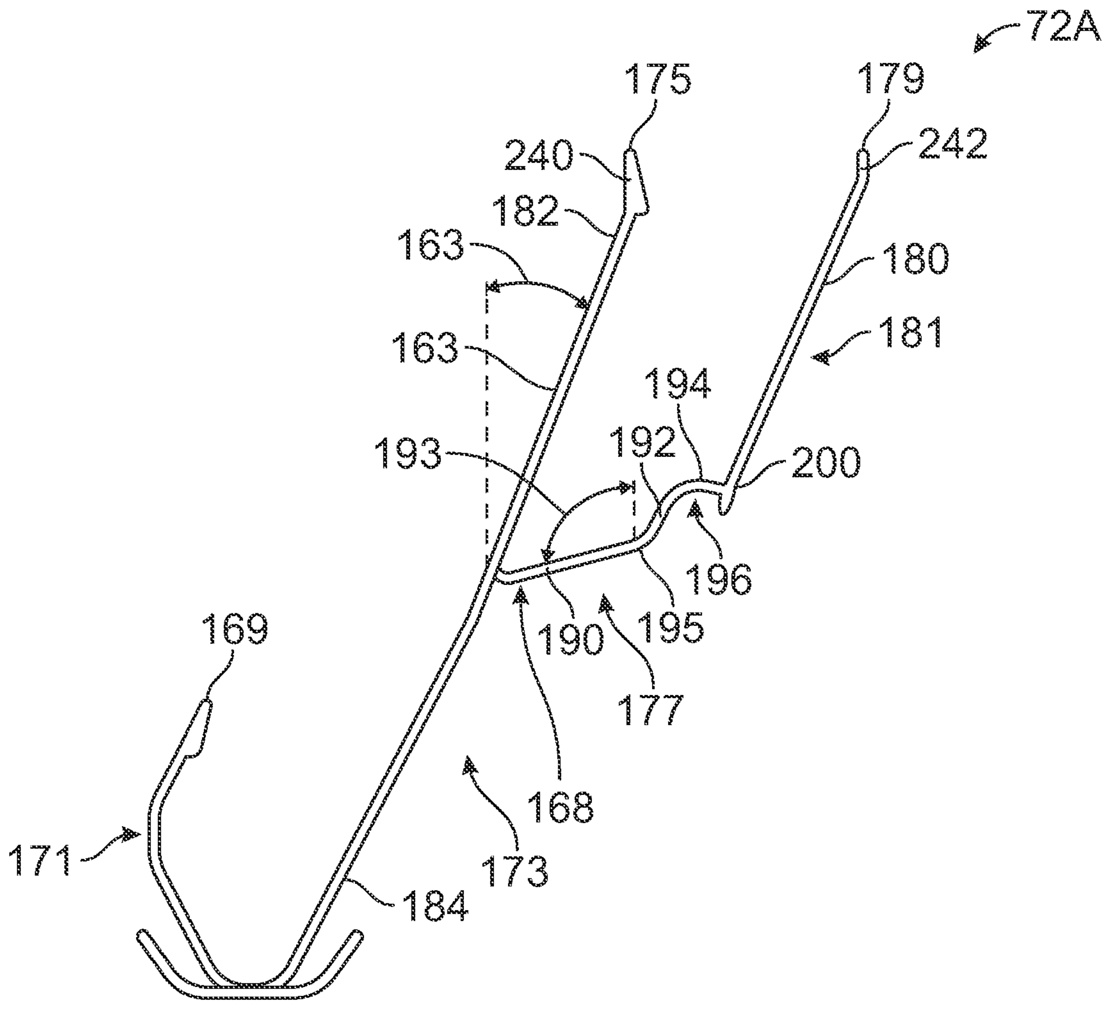
FIG. 6 is an elevational view of one of the liquid collectors of FIG. 5 showing a drip edge at a lower end of the upper primary gutter and a recess upstream of the drip edge that forms an air buffer to direct airflow around the drip edge.

Regarding FIG. 6, the liquid collector body 72A has a forward lower edge 169, a connecting wall portion 171, and a first layback wall portion 173 extending upwardly and rearwardly of the connecting wall portion 173. The liquid collector body 72A further includes an intermediate edge 175 of the first layback wall portion 173, an air diverter wall portion 177, a second layback wall portion 181 extending upwardly and rearwardly of the air diverter wall portion 177, and a rearward upper edge 179 of the second layback wall portion 181.

With continued reference to FIG. 6, the air diverter 168 includes a lower straight wall portion 190, an upper straight wall portion 192, and a juncture 195 therebetween. The angles and dimensions shown in FIG. 6 are exemplary for the embodiment of FIG. 6, and may be +/− approximately five degrees for the angles and +/− approximately 0.1 inches for the dimensions. For example, the lower straight wall portion 190 may be at an angle 193A from the vertical in the range of approximately 100 degrees to approximately 110 degrees such as approximately 105 degrees.

The lower straight wall portion 190 of the air diverter 168 redirects air flow along the lower secondary gutter wall portion 184 of the liquid collector body 72B toward the upper secondary gutter wall portion 182 of the adjacent liquid collector body 72C. The air diverter 168 further includes an air pocket former immediately upstream of the drip edge 200, such as a curved portion 194 having a recess 196 that opens to the air flow path 210 between the liquid collectors 72.

Figure 7:
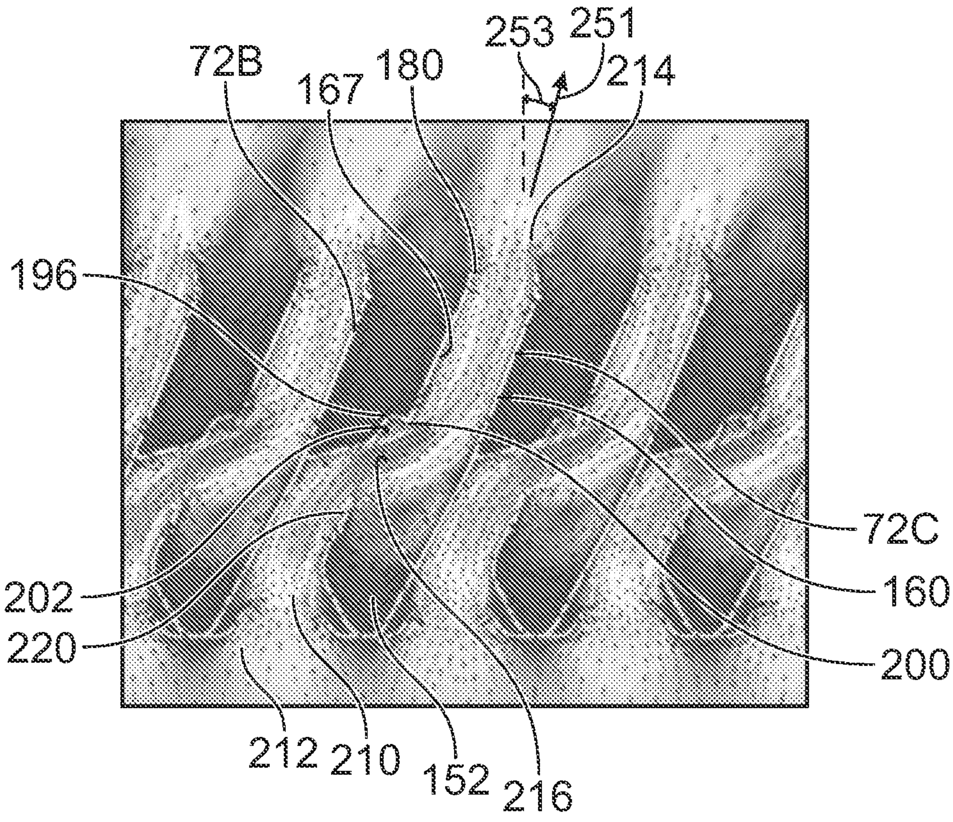
FIG. 7 is an image of a finite element analysis performed on the liquid collectors of FIG. 5 showing the path of air flow through the liquid collectors.

With reference to FIGS. 6 and 7, the recess 196 on the underside of the air diverter 168 creates a lower velocity portion 202 of the air flow between the liquid collectors 72 that operates as an air buffer upstream of the drip edge 200. The air flow path 210 travels through a lower opening 212 between the liquid collectors 72B, 72C and exits an upper outlet opening 214 between the liquid collectors 72B, 72C. The air flow path 210 has a high velocity zone 216 caused by the entering of the air into the lower opening 212 and the redirecting of air by the air diverter 168. The air buffer 202 keeps the high velocity zone 216 away from the drip edge 200. Any liquid that drops off of the drip edge 200 may then be generally urged against the liquid impact surface 160 of the liquid collector body 72B by the high velocity zone 216. This inhibits liquid from flowing over an upper edge 220 of the lip 164 thereby maintaining any liquid that travels along the surface 167 of the primary gutter wall 180 into the secondary gutter 152.

The straight wall portion 190 and the recess 196 of the air diverter 168 provide additional advantages. For example, the straight wall portion 190 and recess 196 redirects the air flow path 210 before the air reaches the drip edge 200 which reduces air side pressure drop, improves air flow, and limits waves in liquid on the liquid impact surface 160 caused by movement of the air across the liquid impact surface 160.

Regarding FIGS. 5 and 6, the upper secondary gutter wall portion 182 and the primary gutter wall portion 180 include redirecting portions 240, 242 that are substantially vertical to encourage air flow upwardly toward the indirect heat exchanger 22. Regarding FIG. 7, the liquid collectors 72 discharge air in a direction 251 that is at an angle 253 relative to the vertical. The angle 253 is in the range of approximately five degrees to approximately 15 degrees, such as approximately eight degrees (see row 276 in the able of FIG. 9). Directing the airflow out of the liquid collectors 72 close to vertical reduces the air pressure drop across the liquid collectors 72 which improves the air flow rate. Further, directing the airflow out of the liquid collectors 72 close to vertical also provides a more even airflow across the indirect heat exchanger 22 which improves the thermal performance of the indirect heat exchanger 22.

Figure 8:
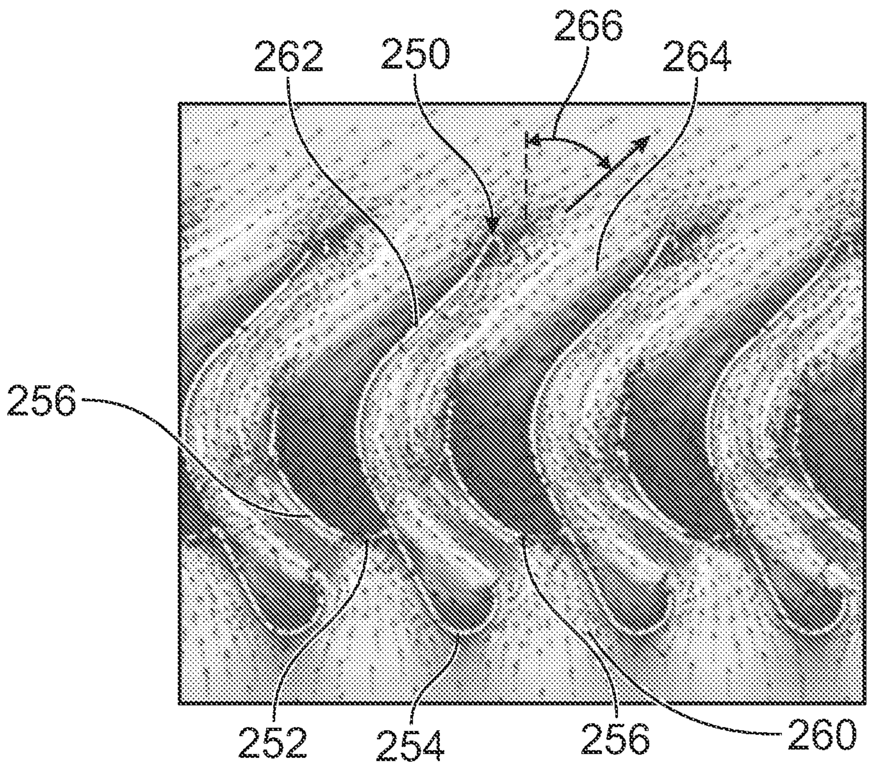
FIG. 8 is an image of a finite element analysis performed on a prior art liquid collectors showing air exiting the prior art liquid collectors at a significantly larger angle relative to the vertical than the air flow exiting the liquid collectors of FIG. 7.

With reference to FIG. 8, a finite element analysis of a prior art liquid collector is provided. The prior art liquid collector has liquid collectors 250 with primary collection channels 252 and secondary collection channels 254. The primary collection channels 252 include a redirecting wall 256 that imparts a significant change in direction to air 258 entering the openings 260 between the liquid collectors 250. The liquid collectors 250 have a liquid impact wall portion 262 that directs liquid into the primary collection channel 252 but also redirects the air flow 258 outward from outlets 264 between the liquid collectors 250 at an angle 266 that may be approximately 56 degrees (see row 274 in FIG. 9). With respect to FIGS. 9 and 10, tables 270, 272 are provided comparing values for a baseline air collector in rows 274 that corresponds to the air collectors 250 shown in FIG. 8 with a prototype in rows 276 that corresponds to the liquid collector body 72 shown in FIG. 5.

Figure 11:
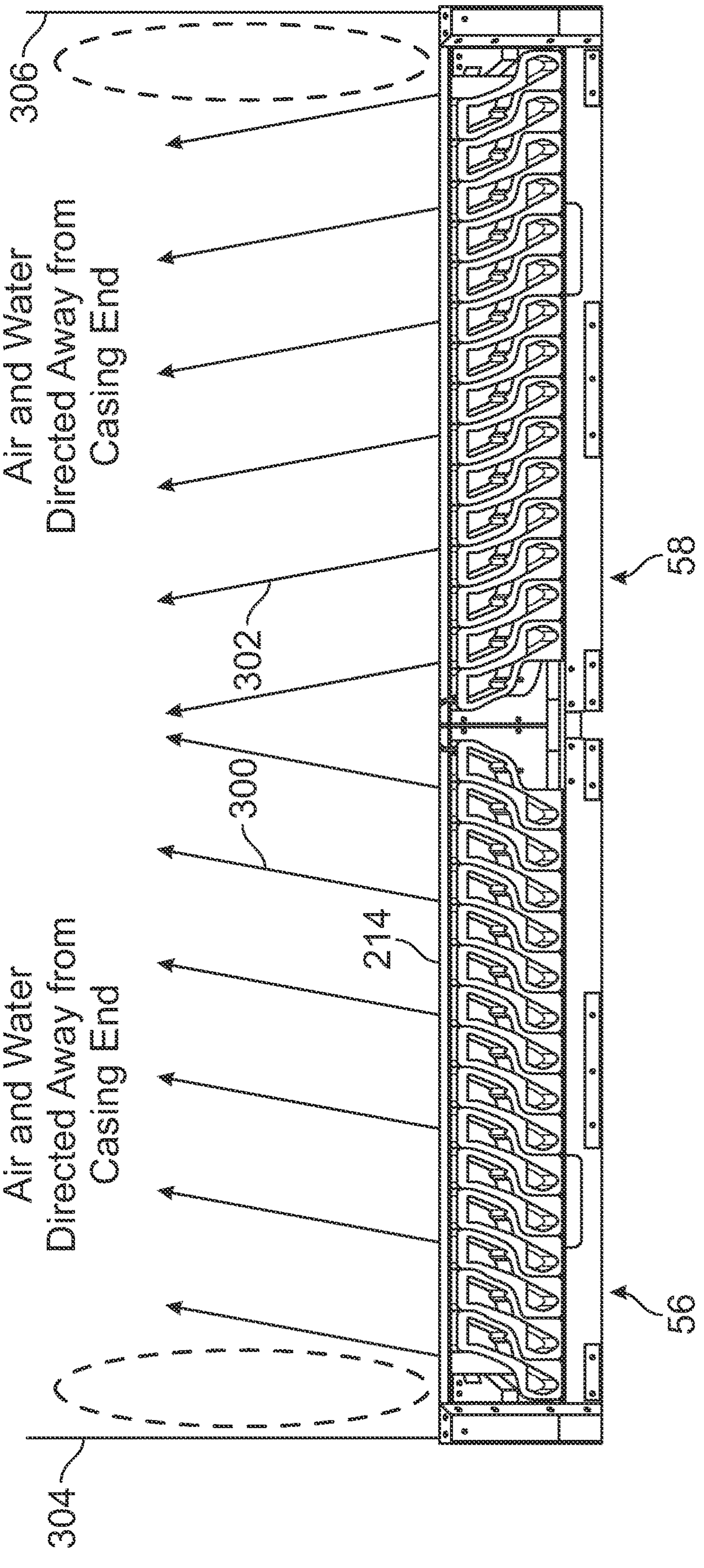
FIG. 11 is a schematic view of the cooling tower of FIG. 2 showing the first and second liquid collector arrays directing air flow away from side walls of the heat exchange subassembly.

With reference to FIGS. 2 and 11, the first and second liquid collector arrays 56, 58 direct air flow in directions 300, 302 out from the openings between the liquid collectors 72 that are transverse to one another and directed toward the coil 40. Further, by orienting the outlets 214 to direct air flow toward one another, the air flow is directed away from walls 304, 306 of the heat exchange subassembly 16. In this manner, the first and second liquid collector arrays 56, 58 direct airflow from the first and second liquid collector arrays 56, 58 toward the coil 40 which increases the efficiency of heat transfer from the coil 40.

Figure 12:
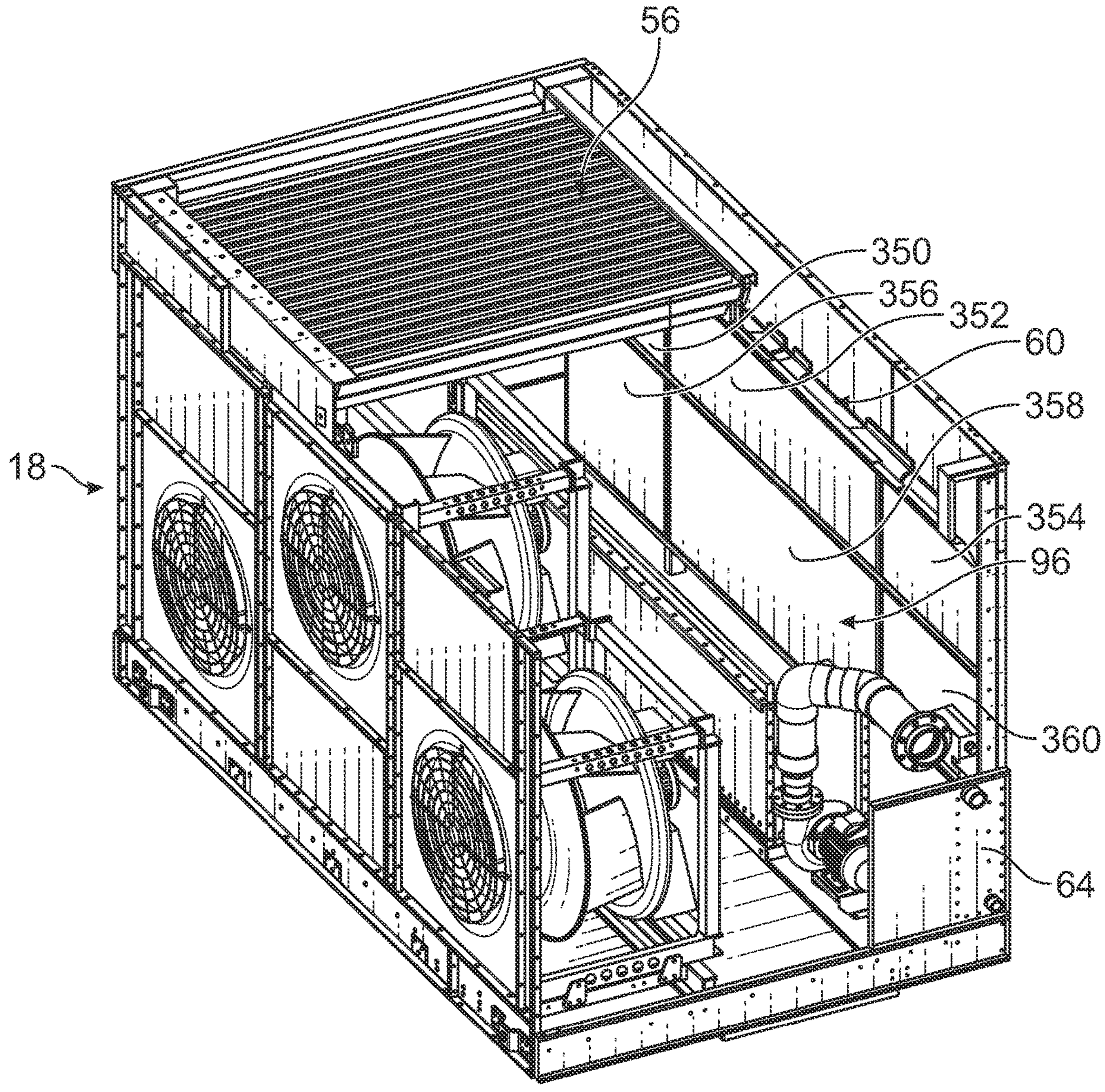
FIG. 12 is a perspective view of a portion of the liquid collector and fan subassembly of FIG. 3 with one of the liquid collector arrays removed to show removable panels of the inner wall that direct liquid into the sump.

Regarding FIG. 12, the liquid collector fan subassembly 18 is shown with the liquid collector array 58 removed to show the inner wall 96 is made of panels 350, 352, 354, 356, 358, 360 that are removable for cleaning purposes.

Figure 13:
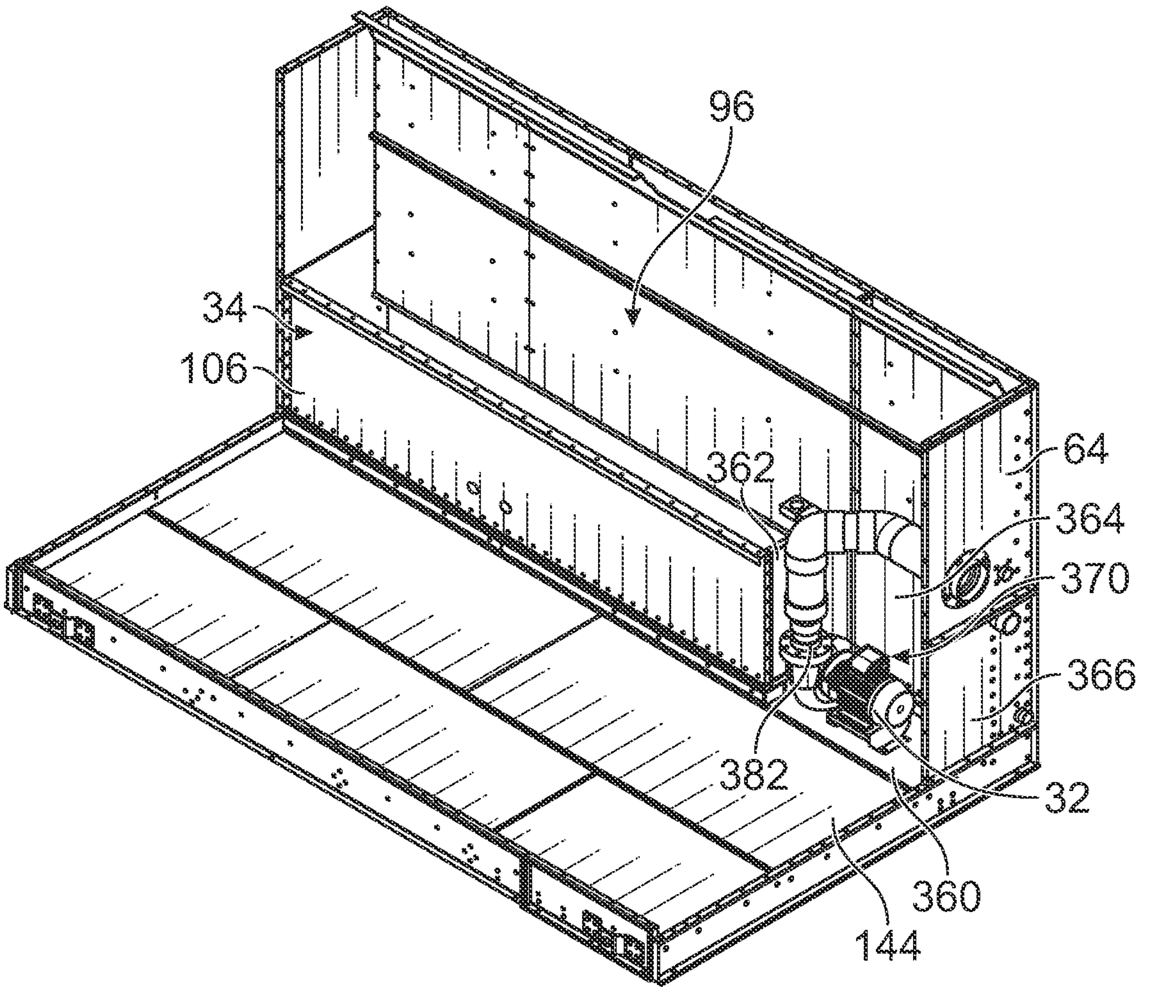
FIG. 13 is a view similar to FIG. 12 with the fans and both liquid collector arrays removed to show the sump, an internal pump compartment, and a pump for pumping collected liquid from the sump to the liquid distribution system.

Regarding FIG. 13, the liquid collector fan subassembly 18 is shown with portions removed to provide an unobstructed view of the pump 34 and an interior pump compartment 360 of the subassembly 18. Because the pump 34 is within the housing 64 of the cooling tower 10, the pump 34 is protected from the environment such as rain, snow debris, which may improve the durability of the pump 34. The interior pump compartment 360 is defined in part by walls 362, 364 of the sump 34 and a wall 366 of the housing 64. The pump 370 has an inlet 380 that draws liquid into the pump 370 and an outlet 382 for directing the evaporative fluid into the tubing 35 (see FIG. 2) to travel to the distribution header 36.

Figure 16:
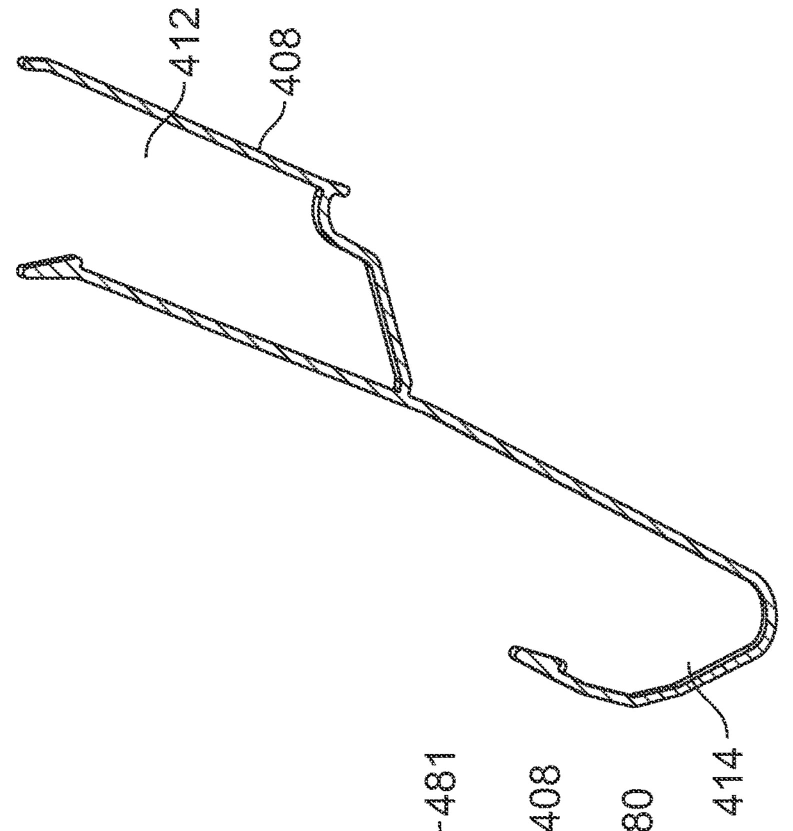
FIG. 16 is a cross-sectional view of the liquid collector assembly of FIG. 15 taken across line 16-16 with the closed endcap removed to show the cross-sectional profile of the liquid collector.
Figure 15:
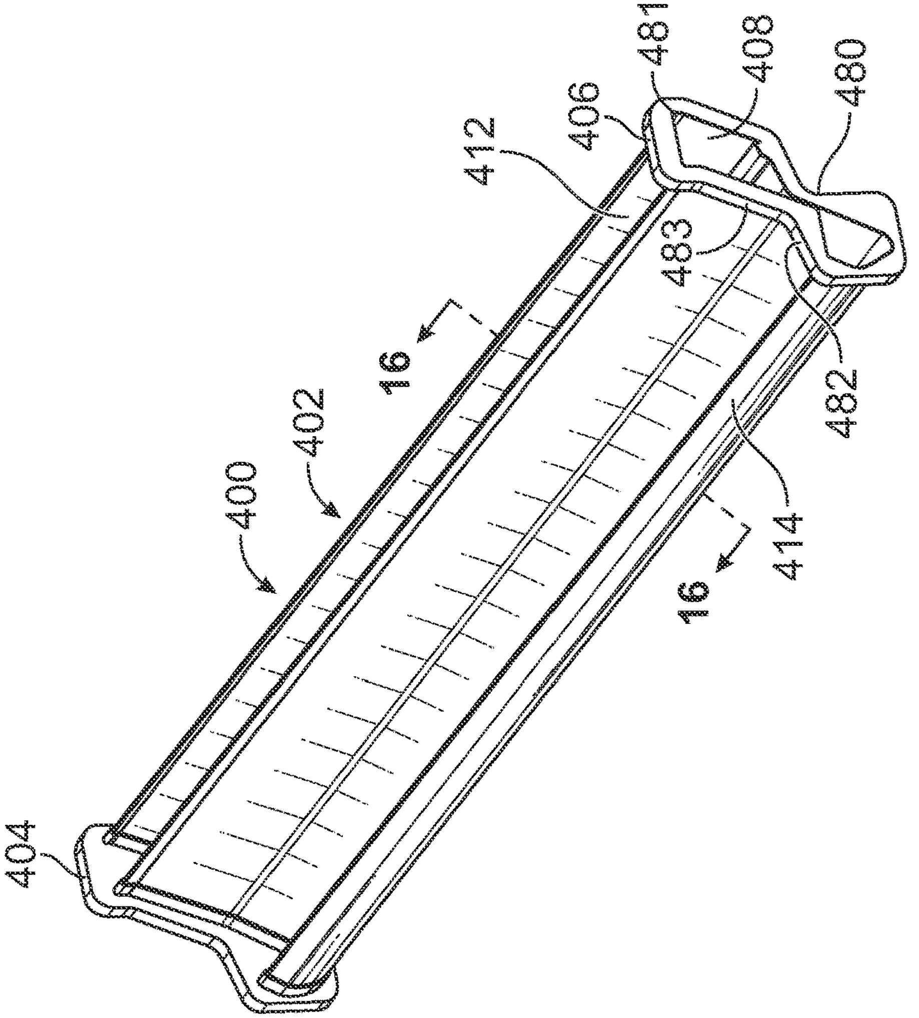
FIG. 15 is a perspective view of a liquid collector assembly including a liquid collector, a closed endcap, and an open endcap.

With reference to FIGS. 15 and 16, a liquid collector assembly 400 is provided that includes a liquid collector body 402, a mounting portion such as a closed endcap 404, and an opposite mounting portion such as an open endcap 406. The open endcap 406 has openings 408, 410 that align with primary and secondary gutters 412, 414 of the liquid collector 408 and permit liquid to flow from the primary and secondary gutters 412, 414 into the gutter 60 (see, e.g., FIG. 4). As shown in FIG. 16, the liquid collector 408 is identical to the liquid collector body 72 discussed above except that the liquid collector 408 does not include the tertiary gutters 166, 170. The liquid collector assembly 400 may be used in place of the liquid collector body 72.

With reference to FIGS. 17-22, a process of assembling a liquid collector array 450 (see FIG. 23) is provided. The liquid collector array 450 is similar to the first and second liquid collector arrays 56, 58 such that the following process may be used to assemble the first and second liquid collector arrays 56, 58. The liquid collector array 450 includes rails 452, 454 for supporting opposite ends of the liquid collector assemblies 400. With temporary reference to FIGS. 2 and 4, the process of assembling or disassembling the liquid collector trays of the cooling tower 10 may be performed by a maintenance worker standing in the walkway 144 below the liquid collectors 72.

Figure 17:
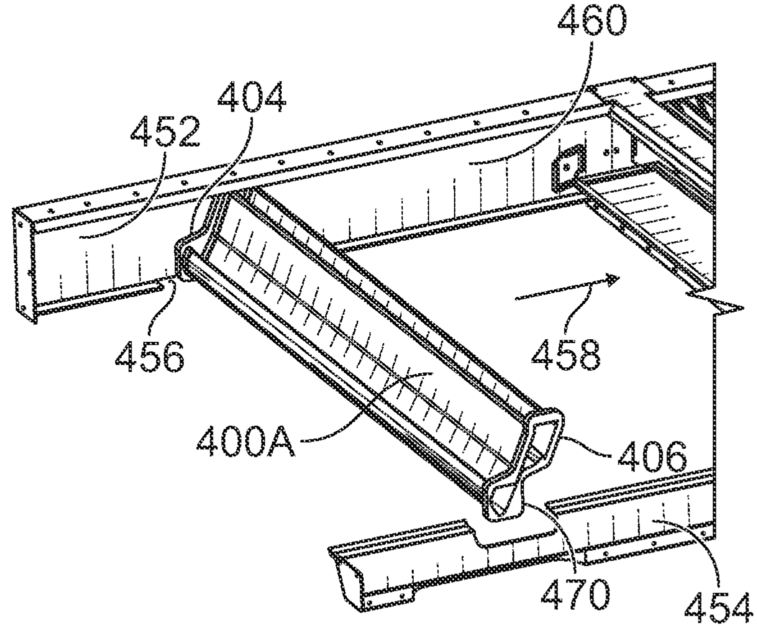
FIGS. 17-23 are perspective views of a process for installing the liquid collector assemblies of FIG. 15 into a liquid collector array
Figure 18:
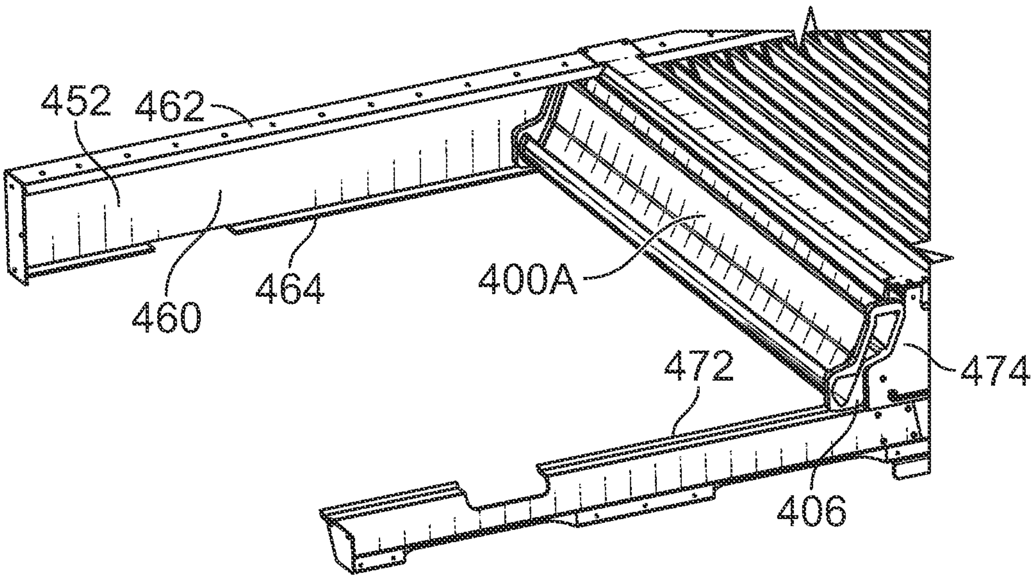

With reference to FIGS. 17 and 18, the first liquid collector assembly 400A is advanced to move the closed endcap 404 upward through an opening 456 in the rail 452 and move the open endcap 406 upward through an opening 470 in the rail 454. The first liquid collector assembly 400A is then shifted in direction 458 to slide the closed endcap 404 into a channel 460 defined between upper and lower flanges 462, 464 of the rail 452 and slide the endcap 406 along an upper flange 472 of the rail 454 until the open endcap 406 engages a stop 474 of the liquid collector array 450. The stop 474 may have a profile that interlocks or mates with the side of endcap 406.

Figure 19:
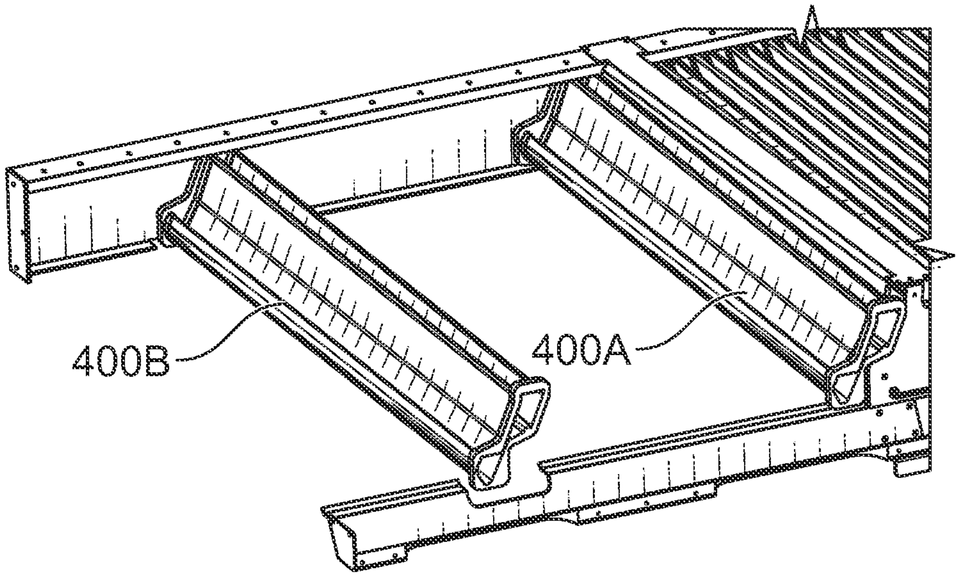
Figure 20:
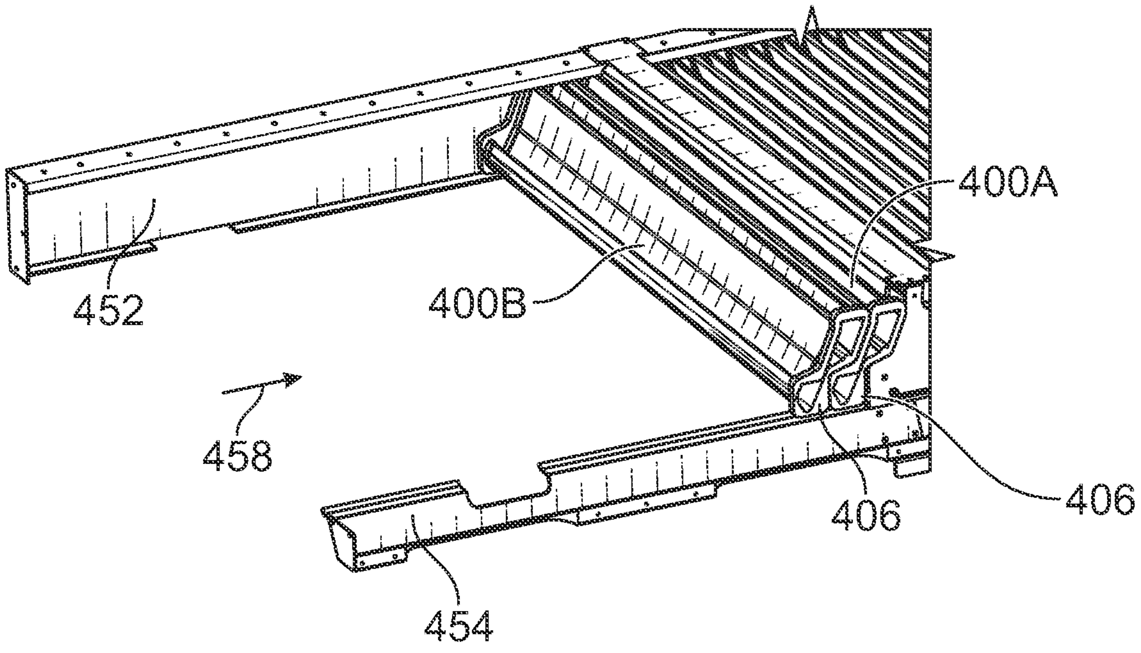

With reference to FIGS. 19 and 20, a similar process is repeated with liquid collector assembly 400B to advance the liquid collector assembly 400B along the rails 452, 454 until the liquid collector assembly 400B seats against the liquid collector assembly 400A. With reference to FIG. 15, the open endcap 406 has a lower recess 480 that receives a projection 482 of an adjacent liquid collector assembly 400. Similarly, the open endcap 406 has an upper projection 481 that extends into a recess 483 of an adjacent liquid collector assembly 400. The closed endcap 404 may have a similar peripheral shape as the open endcap 406.

With reference to FIG. 20, the liquid collector assembly 400B is slid in direction 458 until the closed endcap 404 of the assembly 400B seats against the corresponding closed endcap 404 of the assembly 400A and the open endcap 406 of the liquid collector assembly 400B seats against the open endcap 406 of the liquid collector assembly 400A. In this manner, the open and closed endcaps 404, 406 of adjacent liquid collector assemblies 400 have an interlocking engagement that securely maintains the orientation of the liquid collector bodies 402 once the liquid collector array 450 has been assembled.

Figure 21:
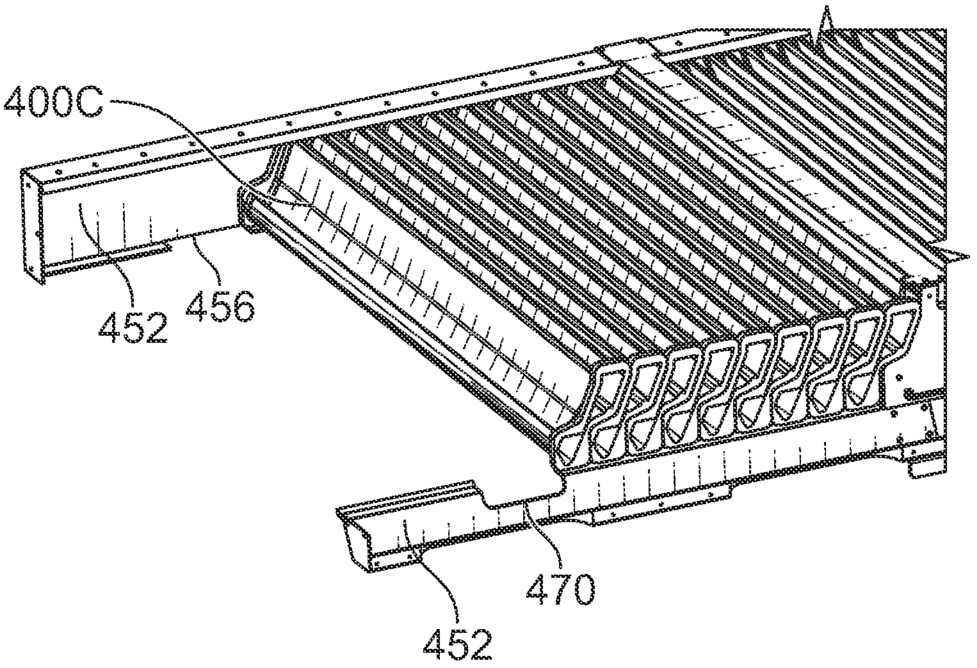
Figure 22:
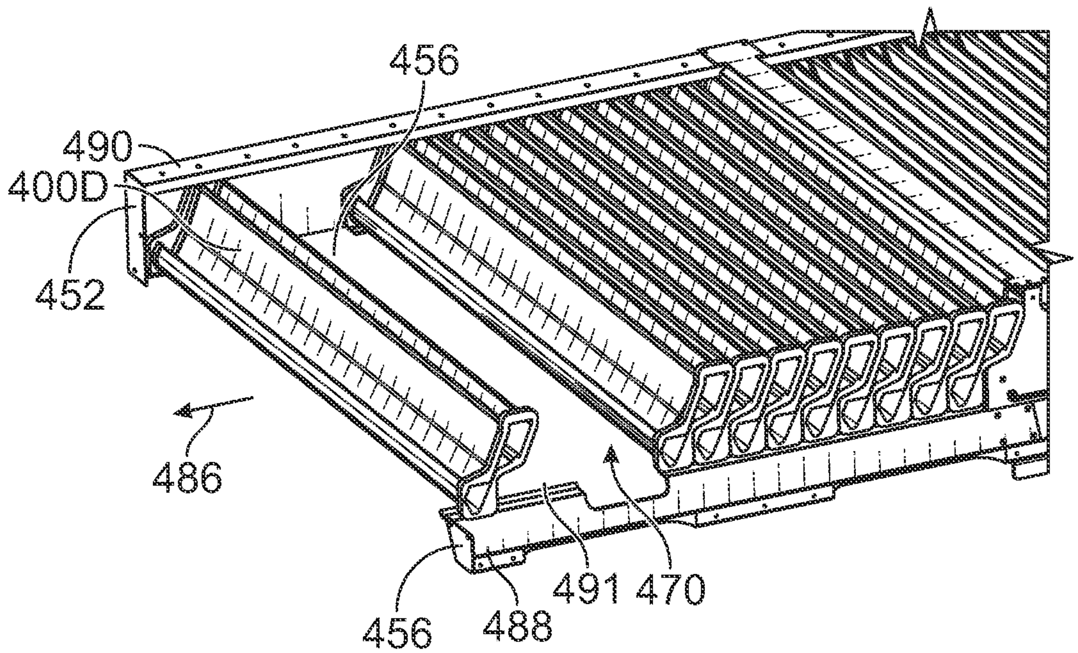

Regarding FIGS. 21 and 22, a number of the liquid collecting assemblies 400 are stacked on the rails 452, 454 until the stacked liquid collecting assemblies 400 reach the openings 456, 470 of the rails 452, 454. Next, the maintenance worker advances a liquid collector assembly 400D upward through the openings 456, 470 and shifts the liquid collector assembly 400D in a direction 486 opposite the direction 458 to position the assembly 400D at an end portion 488, 490 of the rails 452, 454. The procedure of loading liquid collecting assemblies 400 in direction 486 is repeated to fill in a vacant portion 491 of the rails 452, 454.

Figure 23:
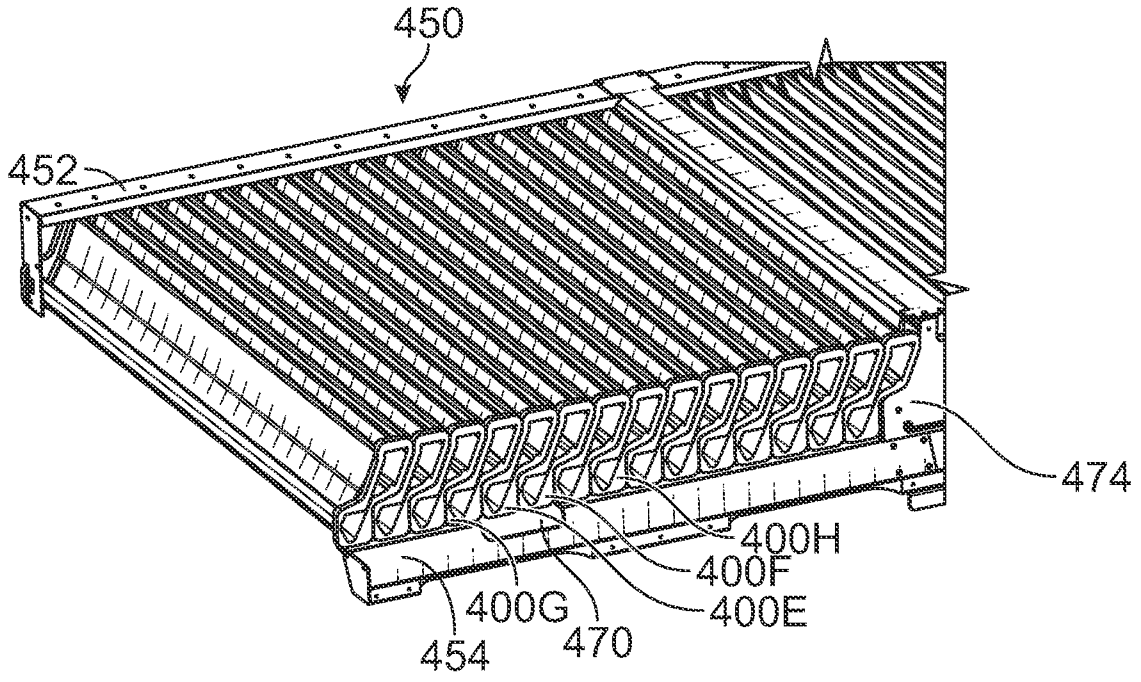
Figure 24:
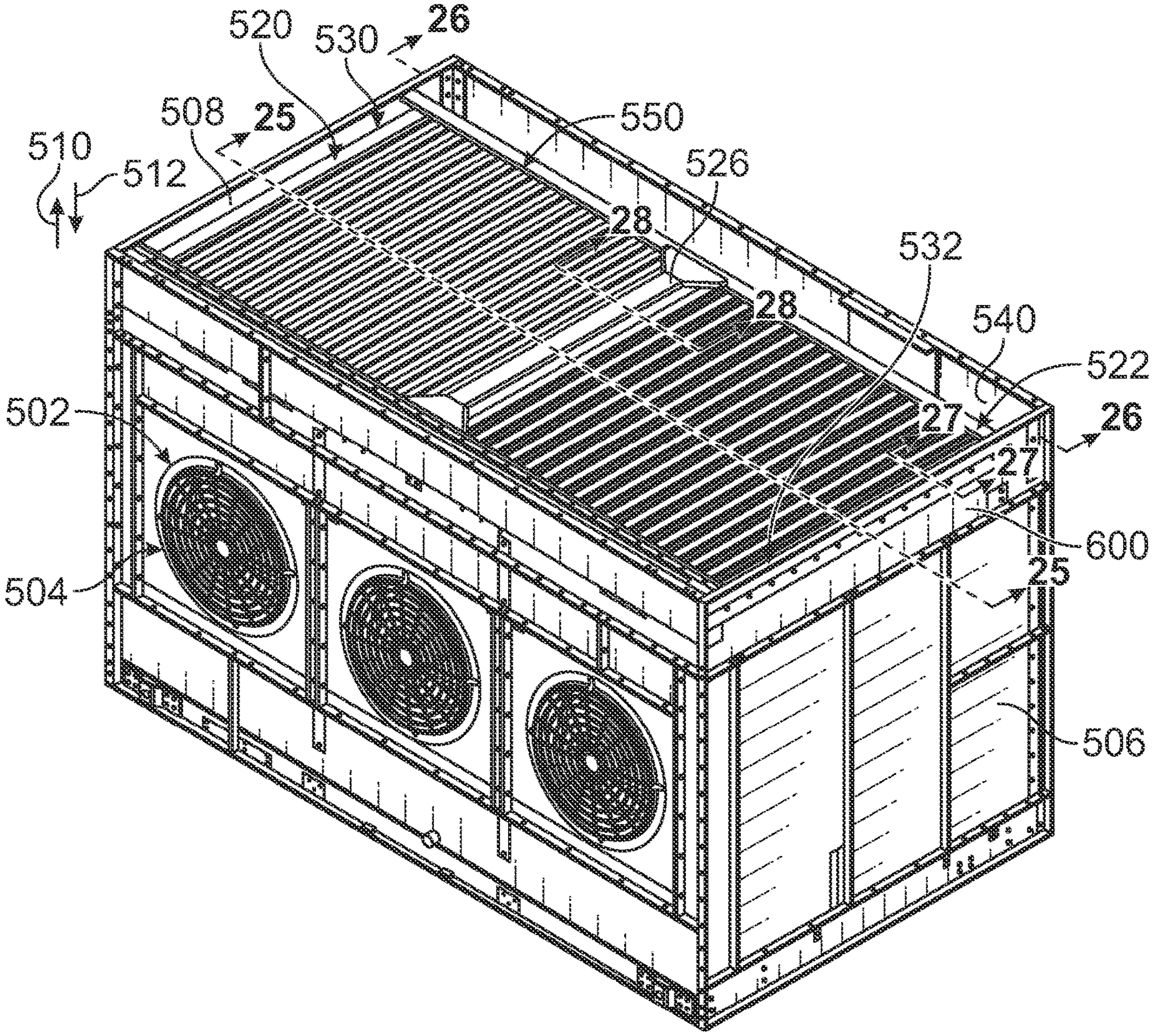
FIG. 24 is a perspective view of another lower liquid collector and fan subassembly.

With respect to FIGS. 23 and 24, the maintenance worker advances liquid collectors 400E, 400F upward into the openings 470, 456 of the rails 452, 454 to lock the endcaps 404, 406 of the liquid collector assemblies 400E, 400F with adjacent assemblies 400G, 400H and air out the liquid collector array 450. In one embodiment, the maintenance worker connects plates to the rails 452, 454 to cover the openings 470, 456 and secure the liquid collector assemblies 400 to the rails 452, 454. To remove the liquid collectors 400 such as for replacement or cleaning, the process of FIGS. 17-23 is reversed.

Regarding FIG. 24, a lower liquid collector and fan subassembly 500 is provided that is similar in many respects to the lower liquid collector and fan subassembly 18 discussed above such that differences will be highlighted. The lower liquid collector and fan subassembly 500 may be utilized with the upper heat exchange subassembly 16 discussed above or with another upper heat exchange subassembly positioned on top of the lower liquid collector and fan subassembly 500. The lower liquid collector and fan subassembly 500 includes an air inlet 502 with fans 504 that draw air into an outer structure, such as a housing 506, and direct the air through an opening 508 in generally upward in direction 510 toward the upper heat exchange subassembly positioned above the lower liquid collector and fan subassembly 500.

Liquid, such as water, falls generally downward in direction 512 into the opening 508 and onto liquid collector arrays 520, 522. The lower liquid collector and fan subassembly 500 has a center deflector 526 to direct liquid that falls thereon into either of the liquid collector arrays 520, 522. Further, the lower liquid collector and fan subassembly 500 has end troughs 530, 532 (see FIG. 27) and a gutter 540 that cooperate with the liquid collector arrays 520, 522 to capture all of the liquid that falls from a heat exchanger (such as coil 40; see FIG. 2) above the lower liquid collector and fan subassembly 500.

Figure 31:
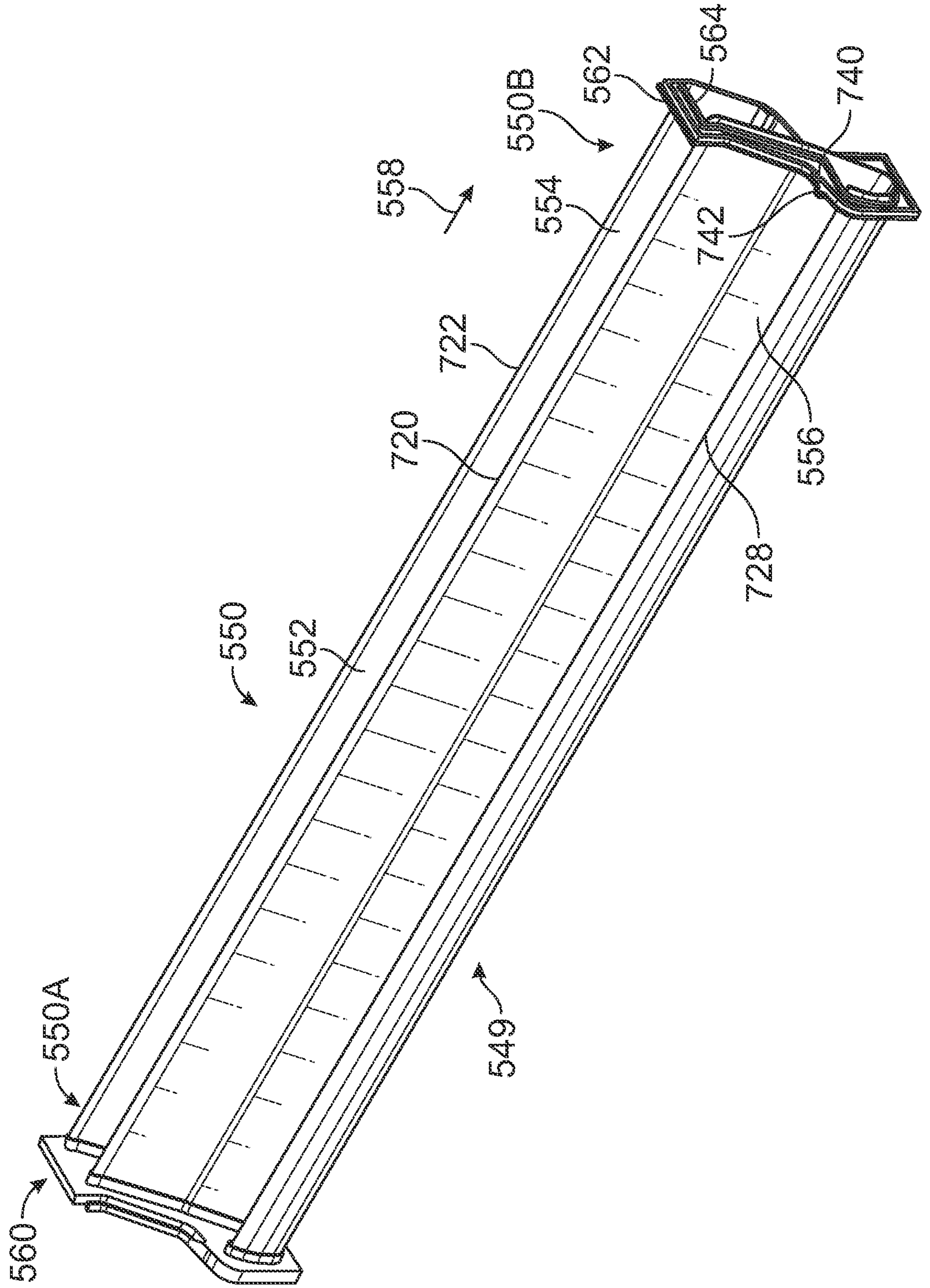
FIG. 31 is a perspective view of a liquid collector assembly of FIG. 29A showing an open end cap of the liquid collector assembly that permits liquid collected in primary and secondary gutters of the liquid collector assembly to exit the liquid collector assembly for collection in the gutter of the lower liquid collector and fan assembly.

Regarding FIGS. 24 and 31, the liquid collector arrays 520, 522 include liquid collectors 549, liquid collector assemblies 550 that are inclined to direct collected liquid toward the gutter 540. The liquid collector assemblies 550 each include a body 552 having a primary gutter 554 and a secondary gutter 556. The body 552 may be made of a metallic material such as stainless steel, a plastic material, or a composite material as some examples. The liquid collector assemblies 550 include mounts at either end portion, 550B of the body 552, such as a closed end cap 560 and open end cap 562. The open end cap 562 has an opening 564 that permits liquid to discharge from the primary gutter 554 and the secondary gutter 556 in a lateral direction 558 into the gutter 540. The closed end cap 560 covers the primary gutter 554 and secondary gutter 556 and inhibits liquid from exiting the primary gutter 554 and secondary gutter 556 in a direction opposite the lateral direction 558. The closed and open end caps 560, 562 may be made of a metal, plastic, or composite material that provides sufficient rigidity to maintain the bodies 552 in position in the liquid collector arrays 520, 522.

Figure 25:
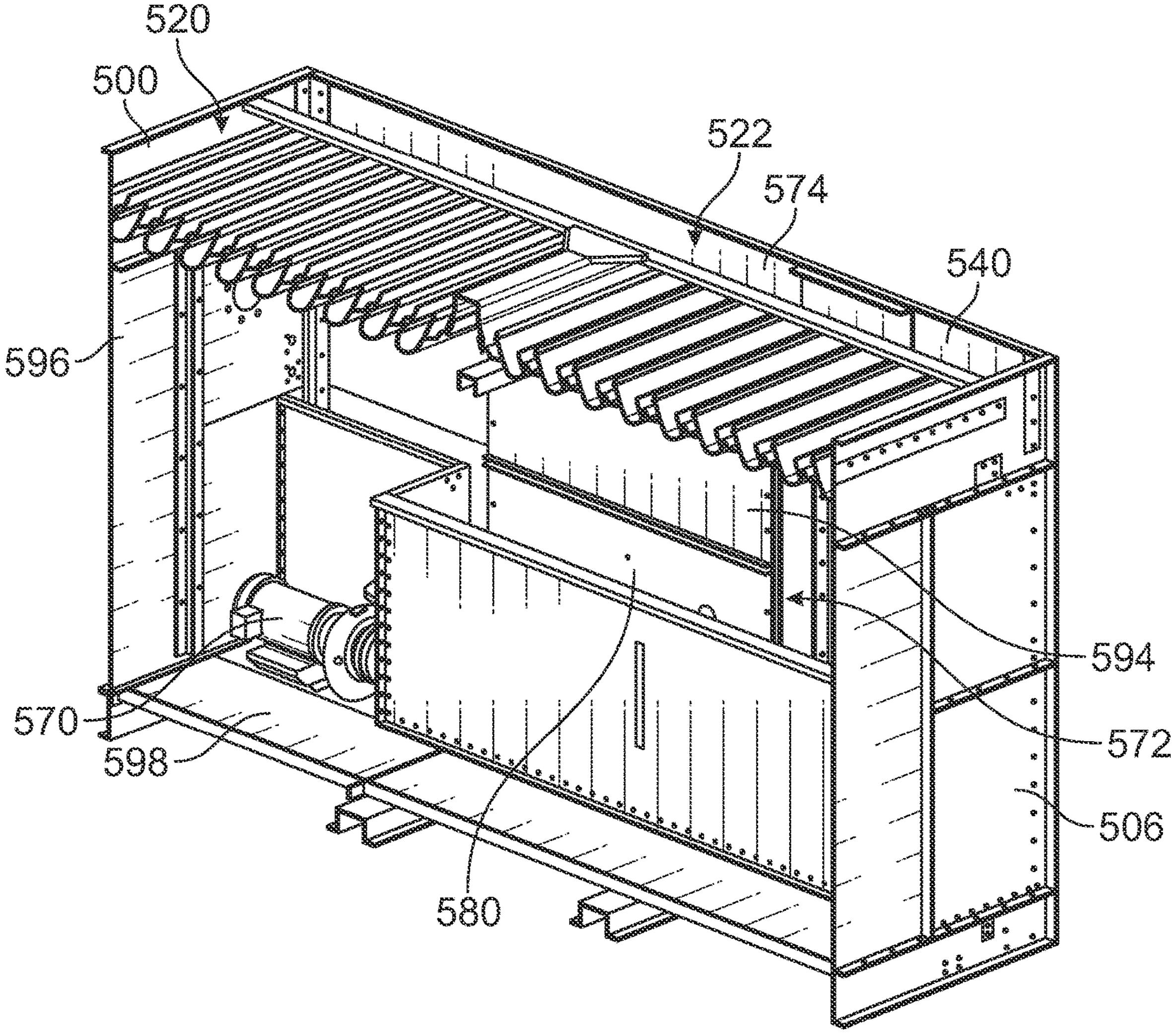
FIG. 25 is a cross-sectional view taken across line 25-25 in FIG. 24, FIG. 25 showing liquid collector arrays above a sump of the lower liquid collector and fan subassembly.
Figure 26:
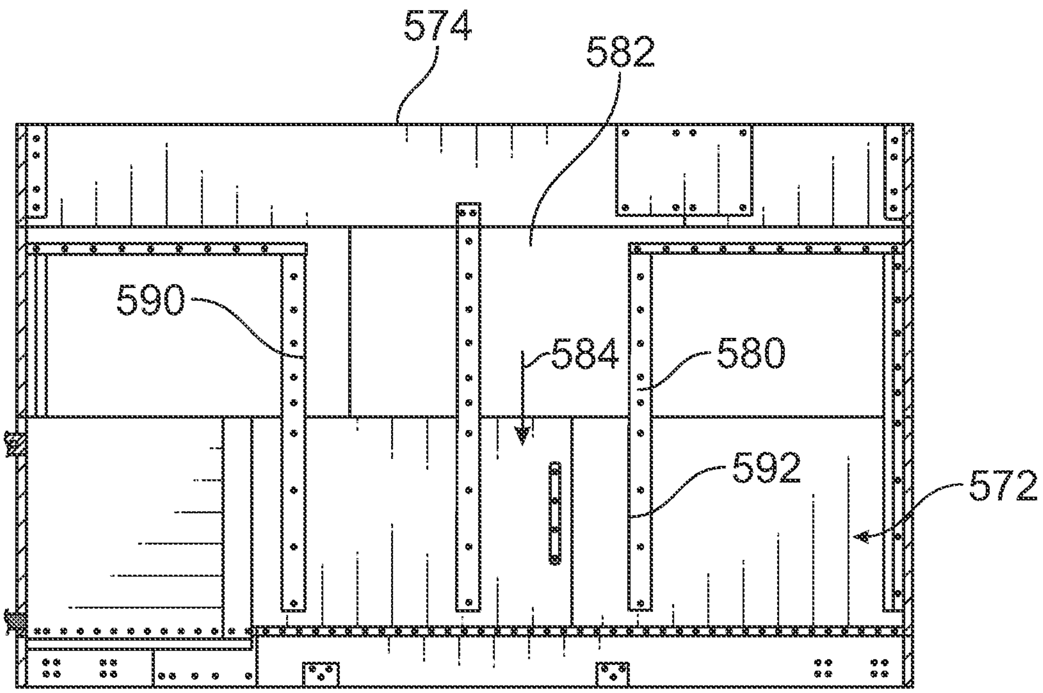
FIG. 26 is a cross-sectional view taken across line 26-26 in FIG. 24 showing side walls of a drain that direct collected liquid from a gutter of the lower liquid collector and fan subassembly to the sump.

Regarding FIG. 25, the lower liquid collector and fan subassembly 500 has a pump 570 and a sump 572 within the housing 506. The housing 506 includes an outer wall 574 that defines a portion of the gutter 540. Regarding FIGS. 25 and 26, the lower liquid collector and fan subassembly 500 has a drain 580 with an opening 582 that opens to the gutter 540 and permits liquid in the gutter 540 to drain generally in direction 584 into the sump 572. The drain 580 has side walls 590, 592 and an inner wall 594 spaced inwardly from the outer wall 574. In this manner, the inner wall 594, side walls 590, 592, and a portion of the outer wall 574 form a rectangular passageway that permits the collected liquid in the gutter 540 to drain into the sump 572 under the effect of gravity. The lower liquid collector and fan subassembly 500 also includes a door 596 that permits access to a walkway 598 between the fans 504 and the sump 572. The walkway 598 remains dry during wet operation of the heat exchanger above the lower liquid collector and fan subassembly 500 due to the liquid collector arrays 520, 522 collecting the falling liquid from the heat exchanger.

Figure 27:
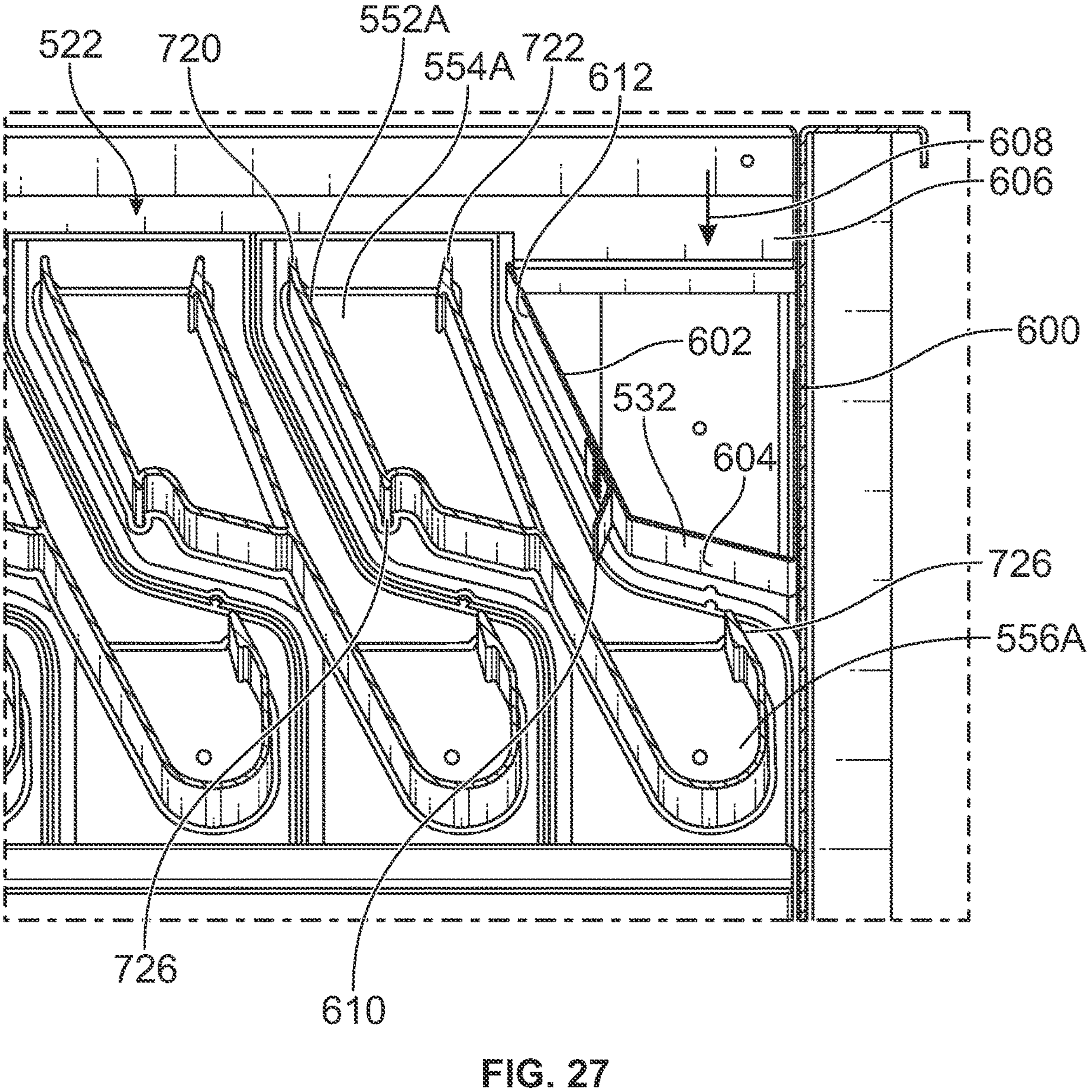
FIG. 27 is a cross-sectional view of a portion of the lower liquid collector and fan subassembly taken across line 27-27 in FIG. 24, FIG. 27 showing an end trough that collects liquid not collected by an adjacent one of the liquid collector assemblies.

Regarding FIGS. 24 and 27, the housing 506 includes an outer wall 600 and the trough 532 is mounted thereto. The trough 532 has an upper wall portion 602 that extends transversely to a lower wall portion 604 of the trough 532. The upper wall portion 602 and the outer wall 600 define an upper opening 606 therebetween that receives liquid falling in direction 608 from the upper heat exchange subassembly above the lower liquid collector and fan subassembly 500. The liquid collector array 522 includes an outer end liquid collector body 552A with a primary gutter 554A and a secondary gutter 556A. The trough 532 is above the secondary gutter 556A and overlaps in a vertical direction with the secondary gutter 556A to capture falling liquid up to the outer wall 600. The trough 532 has a drip edge 610 so that liquid traveling along a surface 612 of the trough 532 is directed into the secondary gutter 556 of the liquid collector 552A. The trough 530 has a similar configuration and operation as the trough 532 and cooperates with the liquid collector array 520 to collect falling liquid in a similar manner as the trough 532 cooperates with the liquid collector array 522.

Figure 28:
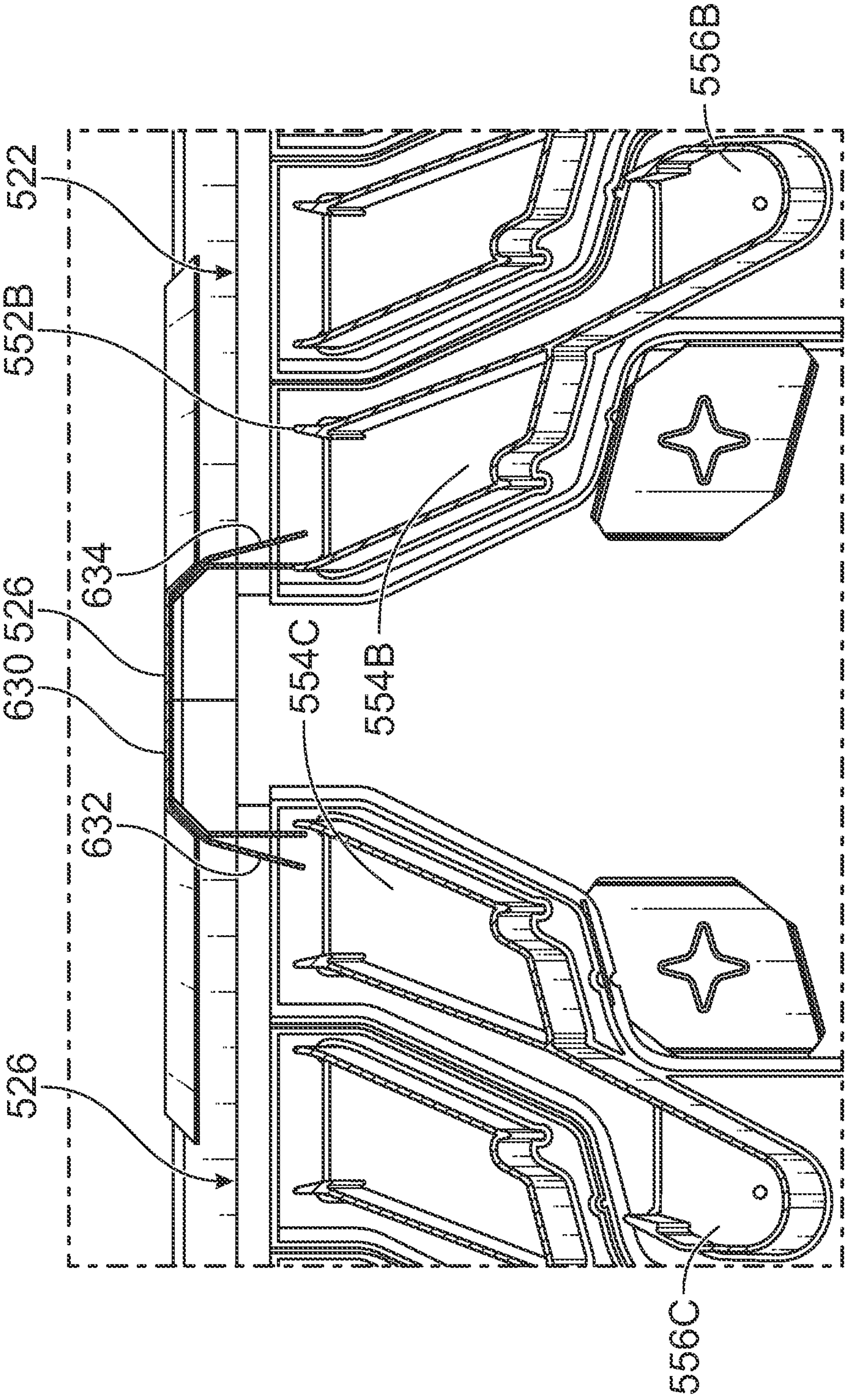
FIG. 28 is a cross-sectional view of a portion of the lower liquid collector and fan subassembly taken across line 28-28 in FIG. 24, FIG. 28 showing an intermediate deflector that deflects liquid into either of the liquid collector arrays.

Regarding FIG. 28, the liquid collector array 522 includes an inner end liquid collector body 552B having a primary gutter 554B and a secondary gutter 556B. Likewise, the liquid collector assembly 526 includes an inner end liquid collector body 552C with a primary gutter 554C and a secondary gutter 556C. The center deflector 526 has an upper surface 630 and first and second portions, such as liquid directing wall portions 632, 634, that direct liquid that falls onto the upper surface 630 into either the inner end liquid collector body 552C or the inner end liquid collector body 552B.

Figure 29A:
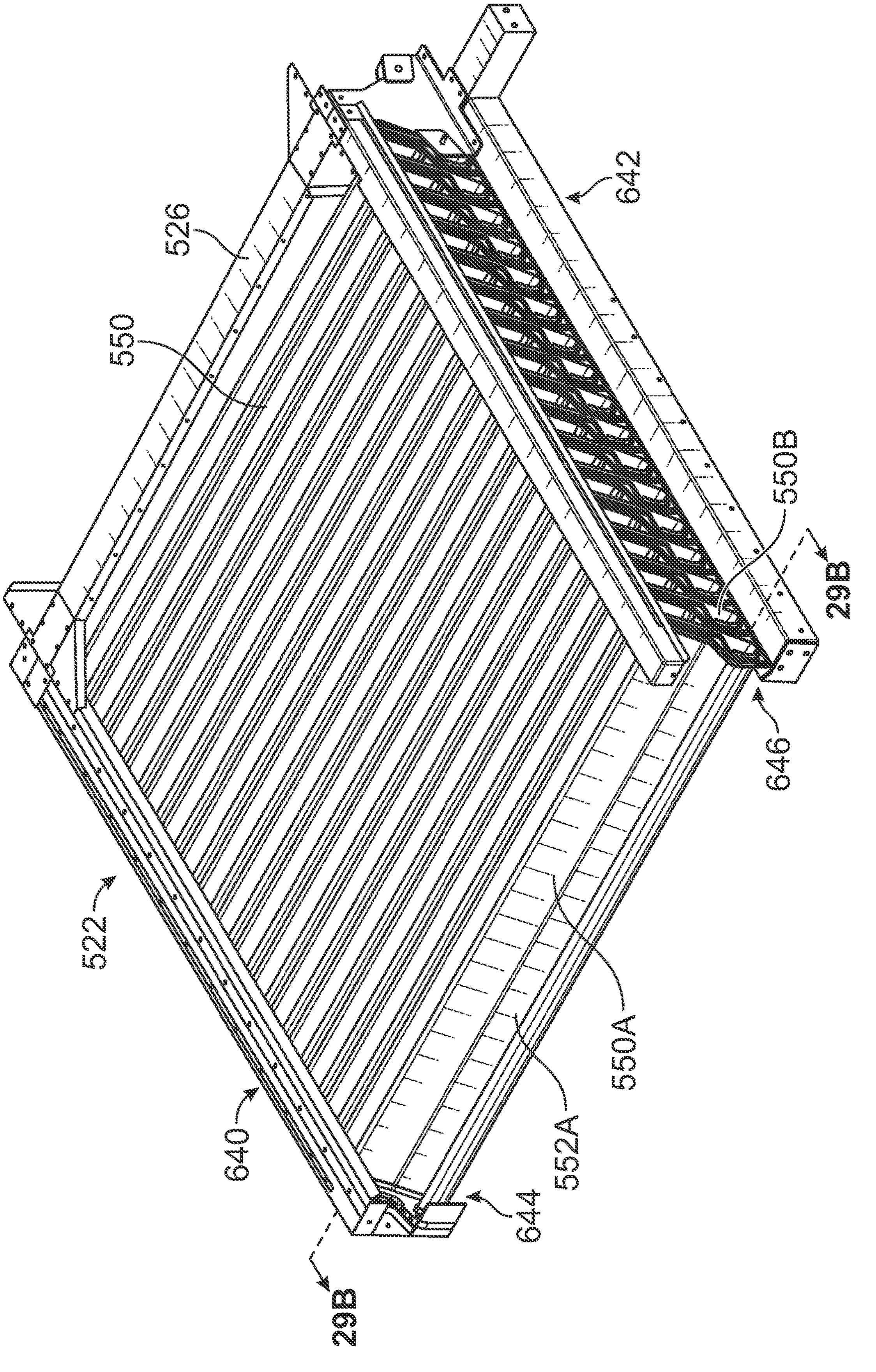
FIG. 29A is a perspective view of one of the liquid collector arrays of FIG. 24 showing longitudinally spaced rails supporting opposite ends of liquid collector assemblies of the liquid collector array.

Regarding FIG. 29A, the liquid collector array 552 is shown and is similar to the liquid collector array 520. The liquid collector array 522 includes rails 640, 642 spaced laterally apart and supporting end portions 644, 646 of the liquid collector assemblies 550 of the liquid collector array 522. The liquid collector assemblies 550 include an outer end liquid collector assembly 550A that includes the outer end liquid collector body 552A discussed above.

Figure 30:
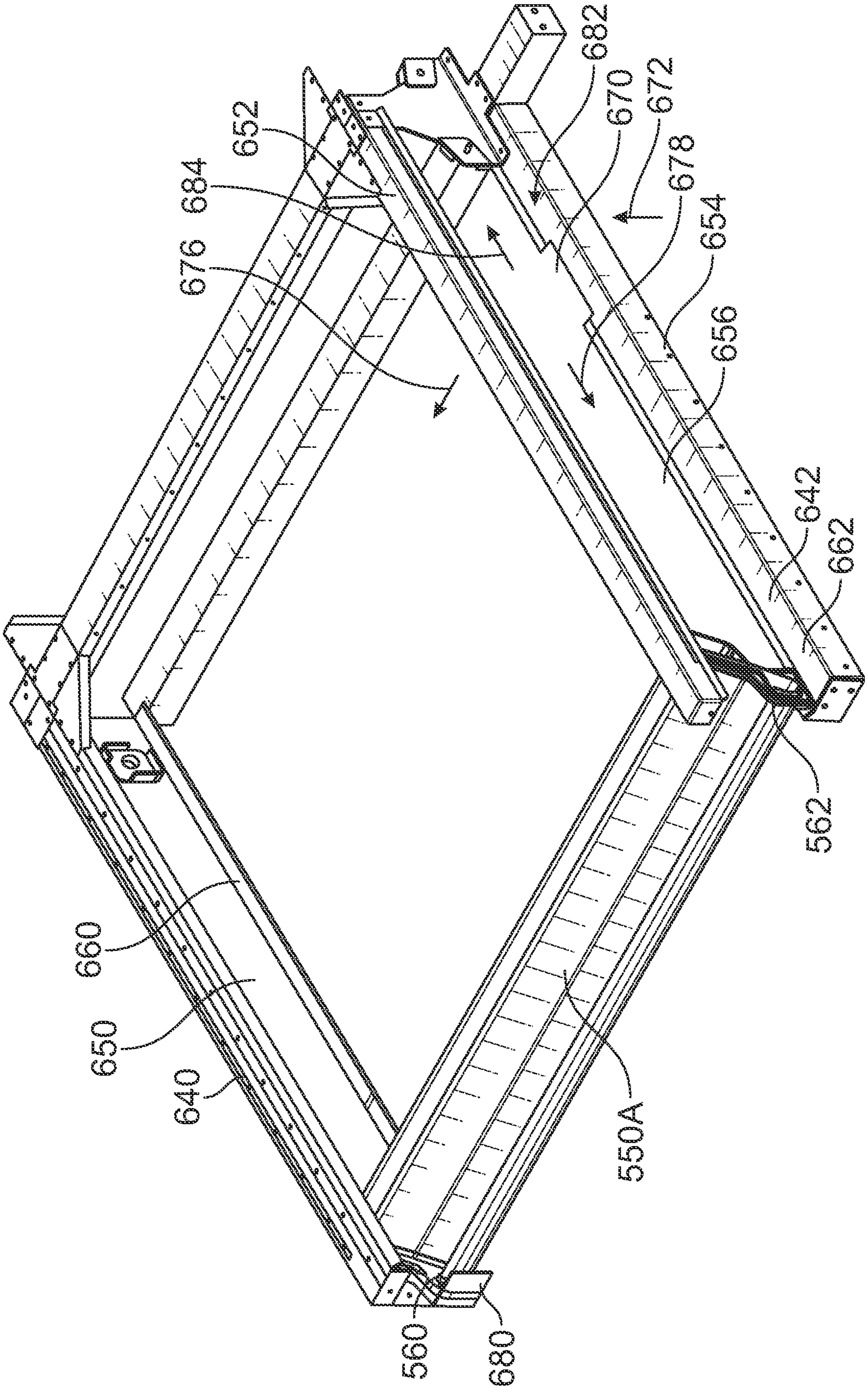
FIG. 30 is a perspective view similar to FIG. 29A with all but one of the liquid collector assemblies removed to show an opening in one of the rails that facilitates sequential advancing of the liquid collector assemblies into position between the rails.

Regarding FIG. 30, all of the liquid collector assemblies 550 are removed except for the outer end liquid collector assembly 550A. The rail 640 includes a channel 650 to receive a closed end cap 560 and the rail 642 includes upper and lower rails 652, 654 that have an opening 656 therebetween to receive the open end caps 562. The rails 640, 642 include lower wall portions 660, 662 that support undersides of the closed and open end caps 560, 562. The lower rail 654 has an opening 670 that permits a user to install or remove the liquid collector assemblies 550 from the below the rails 640, 642 without removing the rails 640, 642. This permits the liquid collector assemblies 550 to be cleaned or replaced as needed by a user in the walkway 598.

To position each of the liquid collector assemblies 550 along the rails 640, 642, each of the liquid collector assemblies 550 are positioned below the rails 640, 642 such that the open end cap 560 of the liquid collector assembly 550 is below the opening 670 of the rail 642. The user then lifts the liquid collector assembly 570 upward in direction 672 until the closed and open end caps 560, 562 are vertically higher than the lower wall portions 660, 662. The user then shifts the liquid collector assembly 550 laterally in direction 676 to position the closed end cap 560 of the liquid collector assembly 550 on the lower wall portion 660 of the rail 640. Then, the liquid collector assembly 550 is shifted longitudinally in direction 678 until contacting either a stop 680 of the rail 640 or another one of the liquid collector assemblies 550. To position liquid collector assemblies 550 at an opposite end portion 682 of the rails 640, 642, a similar process is performed except that the liquid collector assembly 550 is shifted in direction 684 after being advanced upward through the opening 670. In one embodiment, the liquid collector assembly 522 includes a plate or other support that is connected to the lower rail 654 once all of the liquid collector assemblies 550 have been positioned on the rails 640, 642 as shown in FIG. 29A. The plate or support keeps the liquid collector assemblies 550 that are aligned with the opening 670 from disengaging from the lower rails 654.

Figure 32:
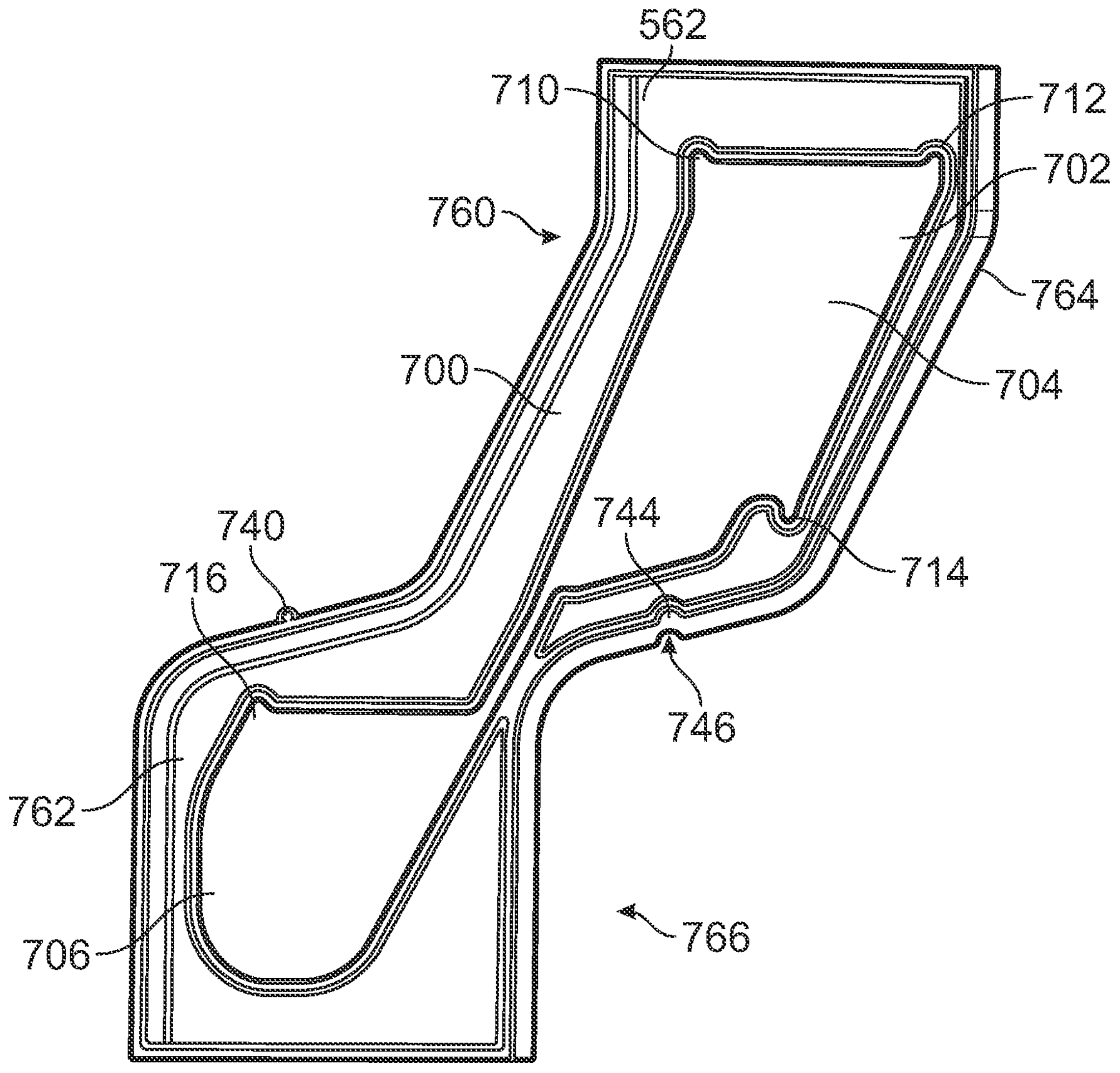
FIG. 32 is a side elevational view of the open end cap of FIG. 31 showing a central opening of the open cap to receive a body of the liquid collector assembly and notches of the open end cap that engage edges of the body of the liquid collector assembly to secure the body in the central opening.

Regarding FIG. 32, the open end cap 562 includes a body 700 that may be made of a plastic material as one example. The body 700 includes one or more openings 702 with a primary gutter opening portion 704 to receive a primary gutter 554 of the liquid collector body 552 and a secondary gutter opening portion 706 to receive the secondary gutter 556 of the liquid collector body 552. The body 700 includes notches 710, 712, 714, 716 that receive edges 720, 722, 726 (see FIG. 27) and edge 728 of the liquid collector body 552. The edges 722, 726 may be leading ends of upwardly oriented barbs of the liquid collector body 552.

The engagement between the notches and edges engages the open end cap 562 with the liquid collector 552. The open end cap 562 includes one or more detents to releasably interlock with the adjacent open end caps once the liquid collector assemblies 550 have been mounted to the rails 640, 642. In one embodiment, the open end cap 562 includes upper and lower detents 740, 742 (see FIG. 31) and upper and lower recesses 744, 746 that engage corresponding recesses and detents of the adjacent open end caps 562.

Regarding FIG. 32, the body 700 of the open end cap 562 has a forward upper recess 760, a forward lower protrusion 762, a rearward upper protrusion 764, and a rearward lower recess 766. When the liquid collector assemblies 550 are installed side-by-side along the rails 640, 642, the forward upper recess 760 of a first liquid collector assembly 550 receives the rearward upper protrusion 764 of a second liquid collector assembly 550 forward of the first liquid collector assembly 550 and the forward lower protrusion 762 of the first liquid collector assembly 550 extends into the rearward lower recess 766 of the second liquid collector assembly 550.

Figure 29B:
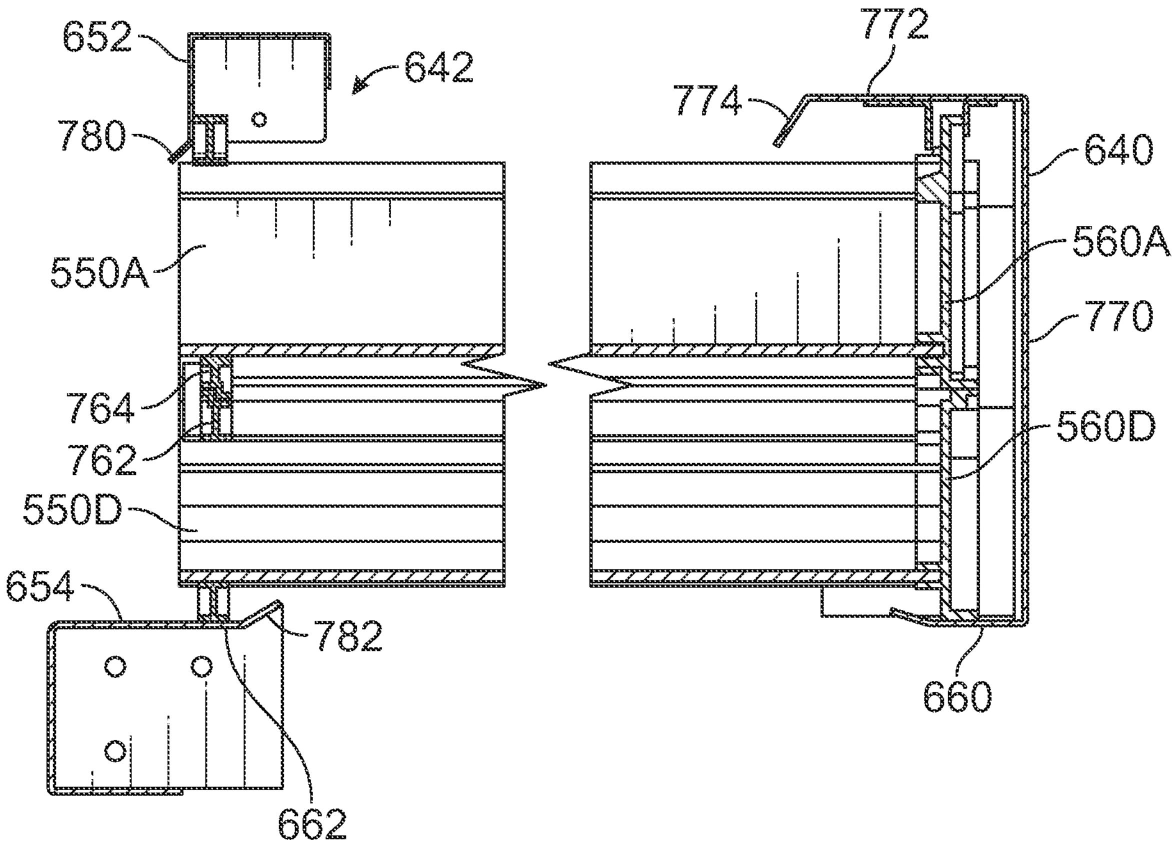
FIG. 29B is a cross-sectional view taken across line 29B-29B in FIG. 29A showing end caps of adjacent liquid collector assemblies stacked on one another and supported by the rails, FIG. 29B having a central portion of the liquid collector assembly omitted for clarity.

Regarding FIGS. 29A and 29B, when the liquid collector assemblies 550 are loaded onto the rails 640, 642, the rearward upper protrusion 764 of the open cap 562 of the forward, liquid collector assembly 550A is stacked in the rail 642 on the forward lower protrusion 762 of the rearward, liquid collector assembly 550B. Likewise, closed caps 560A, 560D of the liquid collector assemblies 550A, 550B are stacked in the rail 640.

Regarding FIG. 29B, the rail 640 has a C-shaped cross section including the lower wall portion 660 for supporting the liquid collector assemblies 550, a vertical wall portion 770, and a horizontal wall portion 772. The rail 640 further includes retainer portions 774, 776 that limit lateral movement of the closed caps 560 in the rail 640. The upper and lower rails 652, 654 likewise include retainer portions 780, 782 that resist lateral movement of the open caps 562 in the rail 642.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims. For example, the liquid collectors discussed above may be utilized with different types of heat exchangers, such as collecting working liquid that falls from fill sheets of a direct heat exchanger of a cooling tower. As yet another example, the liquid collectors described herein may be utilized in direct air carbon capture systems to collect a carbon capture solvent sprayed onto a carbon capture medium such as fill.

What is claimed is:

1. A liquid collector for collecting a falling liquid and permitting air to flow about the liquid collector, the liquid collector comprising:

a forward lower edge;

a connecting wall portion extending downwardly from the forward edge;

a first layback wall portion connected to the connecting wall portion and extending upwardly and rearwardly away from the connecting wall portion, the first layback wall portion having a first inclined surface to receive liquid thereon and direct the liquid toward the connecting wall portion;

an intermediate upper edge of the first layback wall portion rearward of and above the forward lower edge;

an air diverter wall portion connected to the first layback wall portion at a first juncture below the intermediate upper edge, the air diverter wall portion extending rearwardly from the first juncture to a second juncture;

a second layback wall portion connected to the air diverter wall portion at the second juncture which is upward and rearward of the first juncture, the second layback wall portion extending upwardly and rearwardly from the second juncture, the second layback wall portion having a second inclined surface to receive liquid thereon and direct the liquid toward the air diverter wall portion;

a rearward upper edge of the second layback wall portion rearward of the intermediate upper edge and above the forward lower edge;

a primary gutter having a primary upper opening between the intermediate upper edge of the first layback wall portion and the rearward upper edge of the second layback wall portion;

a secondary gutter having a secondary upper opening between the forward lower edge and the first layback wall portion, the secondary gutter having a lower end below the secondary upper opening and defined by the connecting wall and the first layback wall portion;

the first layback wall portion extending upwardly and rearwardly all the way from the lower end of the secondary gutter to the first juncture;

a drip edge extending from the second juncture;

wherein the air diverter wall portion includes a straight wall portion extending upwardly and rearwardly of the first juncture toward the second juncture;

wherein the air diverter wall portion includes an upwardly directed protrusion forward of the second juncture, the upwardly directed protrusion including:

a peak above and forward of the second juncture;

a first portion extending downwardly and rearwardly from the peak to the second juncture;

a second portion extending downwardly and forwardly from the peak to the straight wall portion of the air diverter wall portion;

wherein the upwardly directed protrusion includes an upper surface defining a portion of the primary gutter; and wherein the upwardly directed protrusion includes a lower surface opposite the upper surface and defining at least a portion of a recess forward of the drip edge.

2. The liquid collector of claim 1 wherein the drip edge defines at least a portion of the recess.

3. The liquid collector of claim 1 wherein the drip edge is intermediate the air diverter wall portion and the second layback wall portion; and wherein the upwardly directed protrusion of the air diverter wall portion includes a curved portion forward of the drip edge.

4. The liquid collector of claim 1 wherein the second layback wall portion, the air diverter wall portion, and the first layback wall portion define at least a portion of the primary gutter of the liquid collector.

5. The liquid collector of claim 1 wherein the first layback wall portion includes an upper straight wall portion below the intermediate upper edge and a lower straight wall portion extending transversely to the upper straight wall portion; and the first juncture connecting the upper and lower straight wall portions.

6. The liquid collector of claim 1 wherein the first layback wall portion includes an upper wall portion connecting the intermediate upper edge and the air diverter wall portion; and wherein the upper wall portion of the first layback wall portion and the second layback wall portion extend parallel to one another.

7. The liquid collector of claim 1 wherein one or more of the forward lower edge, intermediate upper edge, and the rearward upper edge is a portion of a barb.

8. The liquid collector of claim 1 wherein the liquid collector has a length and a cross-section perpendicular to the length that is uniform throughout at least a majority of the length of the liquid collector.

9. The liquid collector of claim 1 wherein the liquid collector comprises:

a body including the forward lower edge, the connecting wall portion, the first layback wall portion, the intermediate upper edge, the air diverter wall portion, the second layback wall portion, and the rearward upper edge;

wherein the body has opposite end portions;

an open end cap connected to one end portion of the liquid collector; and a closed end cap connected to the other end portion of the liquid collector.

10. The liquid collector of claim 1 further comprising a lower forward wall portion and a lower rearward wall portion, the lower forward and rearward wall portions protruding below the connecting wall portion and forming tertiary gutters of the liquid collector.

11. The liquid collector of claim 1 wherein the drip edge is upward and rearward of the straight wall portion.

12. The liquid collector of claim 1 wherein the second portion of the upwardly directed protrusion is above the straight wall portion and extends obliquely to the straight wall portion.

13. The liquid collector of claim 1 wherein the drip edge extends extending downwardly from the second juncture and along the recess of the air diverter wall portion, the drip edge being above the straight wall portion of the air diverter wall portion.

14. The liquid collector of claim 1 wherein the first layback wall portion extends upwardly and rearwardly all the way from the first juncture to a third juncture, the first layback wall portion including an intermediate redirecting portion extending upward from the third juncture to the intermediate upper edge and oblique to the first layback wall portion; and wherein the second layback wall portion extends upwardly and rearwardly all the way from the second juncture to a fourth juncture, the second layback wall portion including a rearward redirecting portion extending upward from the third juncture to the rearward upper edge and oblique to the second layback wall portion.

15. The liquid collector of claim 1 wherein the recess of the upwardly directed protrusion includes an upper end above the straight wall portion.

* * * * *